US012529250B2

(12) United States Patent
Killian

(10) Patent No.: US 12,529,250 B2
(45) Date of Patent: Jan. 20, 2026

(54) DOOR POSITIONING DEVICE

(71) Applicant: Daniel E. Killian, Eastlake, OH (US)

(72) Inventor: Daniel E. Killian, Eastlake, OH (US)

( * ) Notice: Subject to any disclaimer, the term of this patent is extended or adjusted under 35 U.S.C. 154(b) by 94 days.

(21) Appl. No.: 18/140,305

(22) Filed: Apr. 27, 2023

(65) Prior Publication Data

US 2023/0349211 A1 Nov. 2, 2023

Related U.S. Application Data

(60) Provisional application No. 63/337,047, filed on Apr. 29, 2022.

(51) Int. Cl.
*E05C 17/54* (2006.01)

(52) U.S. Cl.
CPC .................................... *E05C 17/54* (2013.01)

(58) Field of Classification Search
CPC ........... E05C 17/46; E05C 17/54; E05C 17/02
USPC .......................................................... 292/343
See application file for complete search history.

(56) References Cited

U.S. PATENT DOCUMENTS 2,505,320 A 4/1950 Bernhard
3,620,438 A 11/1971 Weinberger
3,620,483 A 11/1971 Weinberger
3,623,268 A 11/1971 Zepf
4,015,867 A 4/1977 Siden
4,228,842 A 10/1980 Clark
6,003,911 A 12/1999 Sowash
6,550,828 B2 4/2003 Warden
7,452,011 B1 11/2008 Lind
8,176,962 B2 5/2012 Kilfoyle
8,177,266 B2 5/2012 Yates
9,316,033 B2 4/2016 Yates
(Continued)

FOREIGN PATENT DOCUMENTS

BE 1014181 A6 * 6/2003 ........... E05C 17/047
CN 109372358 A * 2/2019 ............. E05C 17/54
(Continued)

OTHER PUBLICATIONS

Volara, Foam Factory Website Page, Published online, Copyright 2023 Foam Factory, Inc.
(Continued)

*Primary Examiner* — Kristina R Fulton
*Assistant Examiner* — James Edward Ignaczewski
(74) *Attorney, Agent, or Firm* — Lippes Mathias LLP

(57) ABSTRACT

A door positioning device includes a door engaging portion including a door channel that receives a door upper edge. The device also includes a frame engaging portion including a frame channel adapted to receive an associated door frame. A connecting portion extends between and interconnects the door engaging portion and the frame engaging portion. The connecting portion maintains a fixed distance between the door engaging portion and the frame engaging portion. The fixed distance can be adjustable. A method of positioning a door relative to a frame includes placing a door engaging portion of a door positioning device on an upper edge of the door and positioning the door such that a select gap is defined. The device is slid on the upper edge of the door toward the outer edge of the door such that a frame channel of the frame engaging portion receives a portion of the frame.

12 Claims, 34 Drawing Sheets

(56) References Cited

U.S. PATENT DOCUMENTS

| | | | | |
|---|---|---|---|---|
| 9,376,844 | B2 | 6/2016 | Go | |
| 9,856,682 | B1 * | 1/2018 | Cook | E05C 19/18 |
| 9,903,144 | B2 | 2/2018 | Gibson | |
| 10,094,158 | B2 | 10/2018 | McRoskey et al. | |
| 10,443,286 | B1 * | 10/2019 | Cocco | A47L 15/4257 |
| 10,501,968 | B2 | 12/2019 | Maher | |
| 11,371,272 | B2 | 6/2022 | Pesacov | |
| 2012/0279538 | A1 * | 11/2012 | Chen | E05C 19/18 292/289 |
| 2014/0015259 | A1 | 1/2014 | Harrigan | |
| 2017/0204641 | A1 * | 7/2017 | Maher | E05C 17/30 |
| 2019/0112850 | A1 * | 4/2019 | D'Souza | E05C 17/54 |
| 2019/0136593 | A1 * | 5/2019 | McCallister | D06F 39/14 |
| 2020/0102774 | A1 * | 4/2020 | Maher | E05C 17/047 |
| 2021/0189783 | A1 | 6/2021 | Siriwardana | |
| 2021/0396055 | A1 * | 12/2021 | Pesacov | E05B 65/0014 |
| 2022/0042358 | A1 * | 2/2022 | Gordon | E05C 17/52 |
| 2022/0170300 | A1 | 6/2022 | Dutton | |
| 2023/0108739 | A1 * | 4/2023 | Major | E05C 17/46 16/85 |

FOREIGN PATENT DOCUMENTS

| | | | |
|---|---|---|---|
| ES | 2392413 | A1 | 12/2012 |
| WO | 03/080973 | A1 | 10/2003 |
| WO | 2003080973 | A1 | 10/2003 |

OTHER PUBLICATIONS

Door Buddy #1 Document, 2 Pages, Date: Printed Jul. 2023 (Product Date Unknown).

Door Buddy #2 Document, 5 Pages, Date: Oct. 26, 2016.

Door Buddy #3 Document, 7 Pages, Date: Printed Jul. 2023 (Product Date Unknown).

Foam Factory, Volara, 2 pages, Foam Factory, Inc., Date: Copyright 2022.

* cited by examiner

DOOR POSITIONING DEVICE

CROSS-REFERENCE TO RELATED APPLICATION

This application claims priority from and benefit of the filing date of U.S. provisional application Ser. No. 63/337,047 filed Apr. 29, 2022, and the entire disclosure of said provisional application is hereby expressly incorporated by reference into the present specification.

BACKGROUND

Interior doors within a household are typically considered open, or closed with a latching mechanism, that may or may not include a locking mechanism on the door handle that implements the latching function. Instances arise where it is desirable to hold a door open in a stable position and gap relative to the door jamb that remains stable regardless of whether the door is pushed or pulled further open or closed. These instances include but are not limited to allowing a small animal, such as a cat, to pass through the door opening but not allow a larger animal, such a dog or even a toddler, to pass through the partially open door. Other instances include holding the door partially open to allow air to flow to pass without being blown closed in a forced air HVAC (Heating Ventilation Air Conditioning) system, or simply to hold a bedroom door in a partially open position for a child at night.

Door hardware that can hold a door at a relatively fixed open position includes but not limited to:

A wedge type device.

A foot type device

A strap and stopper configuration of devices

A door bracing device

A door retaining device.

A wedge type device can be placed between the bottom of the door and floor and can hold a door in a steady position through friction and pressure when the door is pushed in one direction but not in the opposite direction. The position of the wedge is likely variable as it is repeatedly engaged and disengaged with the door when transitioning from a normal functioning door to one set at a relatively consistent fixed open position. Manipulation of the wedge is typically from only one side of the door opening, potentially limiting the use of the door from both sides. The effectiveness of a wedge used in this manner is dependent on the type of floor material.

A kick down or foot type door stop device can be mounted to the bottom of a door, typically by attaching it with screws or possibly with very high bond adhesives, that functions similarly as a wedge by holding a door open in a steady position through friction and pressure when the door is pushed in one direction but not in the opposite direction. Foot type devices can have a latching mechanism which can keep the door positioned when being pushed from either direction. The position of the open door is variable as it is repeatedly engaged and disengaged with the floor when transitioning from a normal functioning door to one set at a relatively consistent fixed open position. Manipulation of this type of doorstop is typically from only one side of the door opening, potentially limiting the use of the door from both sides. The effectiveness of a foot type door-stop device used in this manner is dependent on the type of floor material.

A strap or strap and stopper configuration utilizes a flexible strap affixed to mounting points on the door and door jamb. The mounting points on the door and door jamb would typically be through the use of adhesives or alternatively with screws. The strap would have a release mechanism at one end of the mounting points that requires the reduction of the gap between the door and door jamb to enable. A door stopper mechanism is attached to the door edge, typically held in place by friction and compression of the material, to keep the door from closing completely yet allowing sufficient movement to disengage the strap when it is desired to open the door further. The door stopper has to be removed to allow the door to close completely.

A door bracing device, as described in US Patent Publication No: US 2022/0170300 A1 utilizes the existing doorknob and latching mechanism and corresponding strike plate engagement to hold a door in a fixed partially open position. Because door latching mechanisms are typically thirty-six inches from the bottom of the door, leaving this mechanism readily accessible to a medium to large sized dog and within reach of a toddler that could compromise the functionality of this arrangement.

A Door Retaining Device as described in WIPO patent application publication WO 03/080973 A1 provides a means to hold a door in a fixed partially open position with the use of a striker plate attached to the door frame. While this allows the means to choose the vertical position of the device along the door edge, physically attaching the striker plate by means of screws or adhesive may not always be desirable.

SUMMARY

In accordance with one aspect of the present development, a door positioning device includes a door engaging portion including a door channel adapted to receive an associated door upper edge. The device also includes a frame engaging portion including a frame channel adapted to receive an associated door frame. A connecting portion extends between and interconnects the door engaging portion and the frame engaging portion.

In accordance with another aspect of the present development, a method of immovably positioning a door relative to a door frame includes placing a door engaging portion of a door positioning device on an upper edge of the door by locating the upper edge of the door in a door channel of the door engaging portion, wherein the door positioning device further includes a frame engaging portion connected to the door engaging portion and maintained at a select distance from said door engaging portion. The method further includes positioning the door such that a select gap is defined between an outer edge of the door and a latch jamb portion of the door frame. The door engaging portion of the door positioning device is slid on the upper edge of the door toward the outer edge of the door such that a frame channel of the frame engaging portion of the door positioning device receives a portion of the door frame therein whereby the door is prevented from moving in an opening direction or a closing direction relative to the door frame.

DETAILED DESCRIPTION OF THE PRESENT DEVELOPMENT

Figure 1:
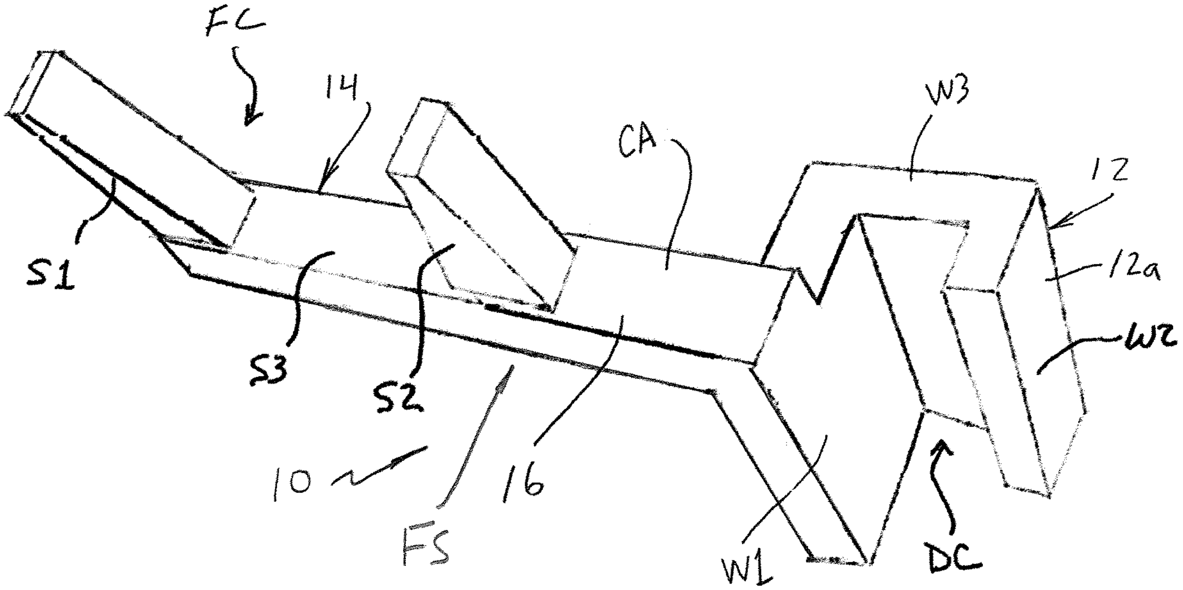
FIG. 1 is an isometric view of a first embodiment of a door positioning device configured for use with a left-hand door installation.
Figure 2:
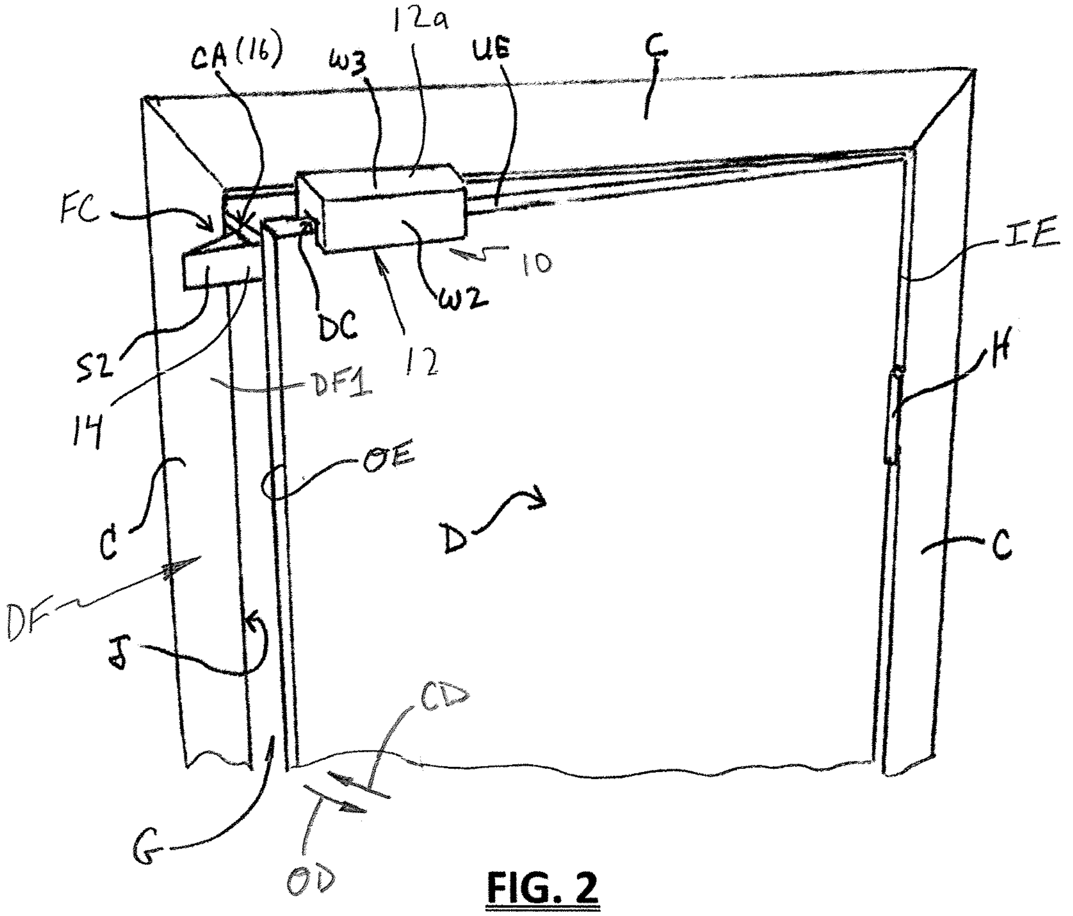
FIG. 2 shows the device of FIG. 1 operatively installed on a door and located in an engaged position.
Figure 3:
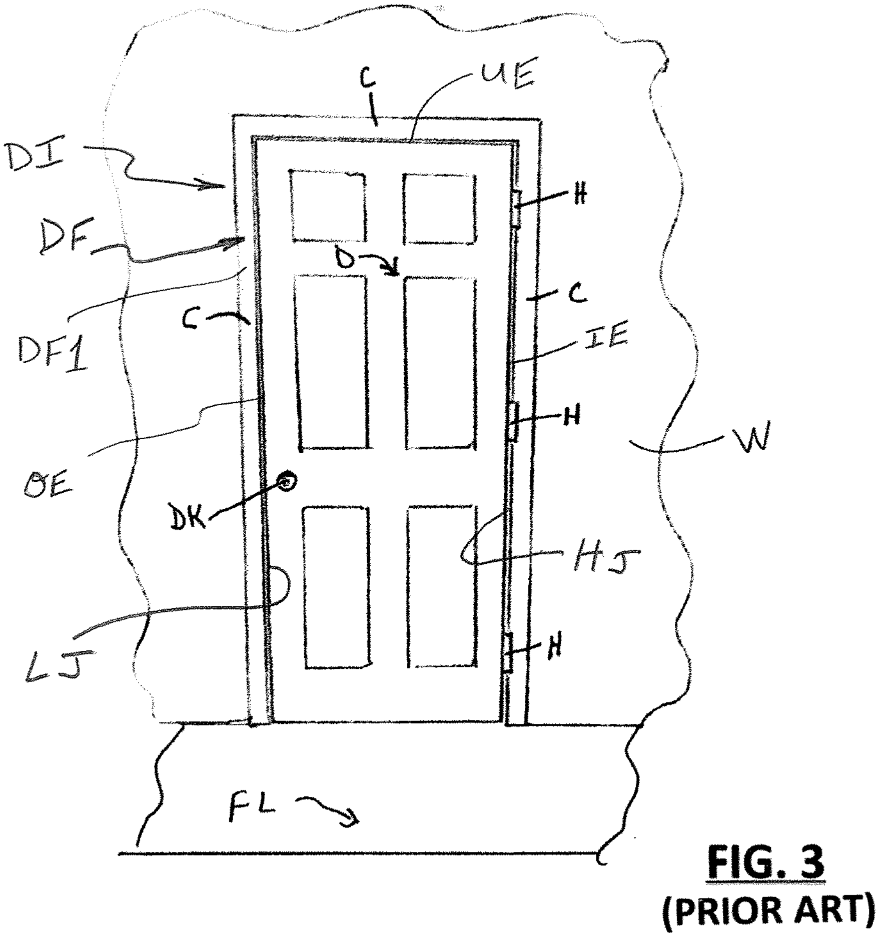
FIG. 3 (PRIOR ART)
FIG. 3 (prior art) shows a conventional left-hand door installation.
Figure 5:
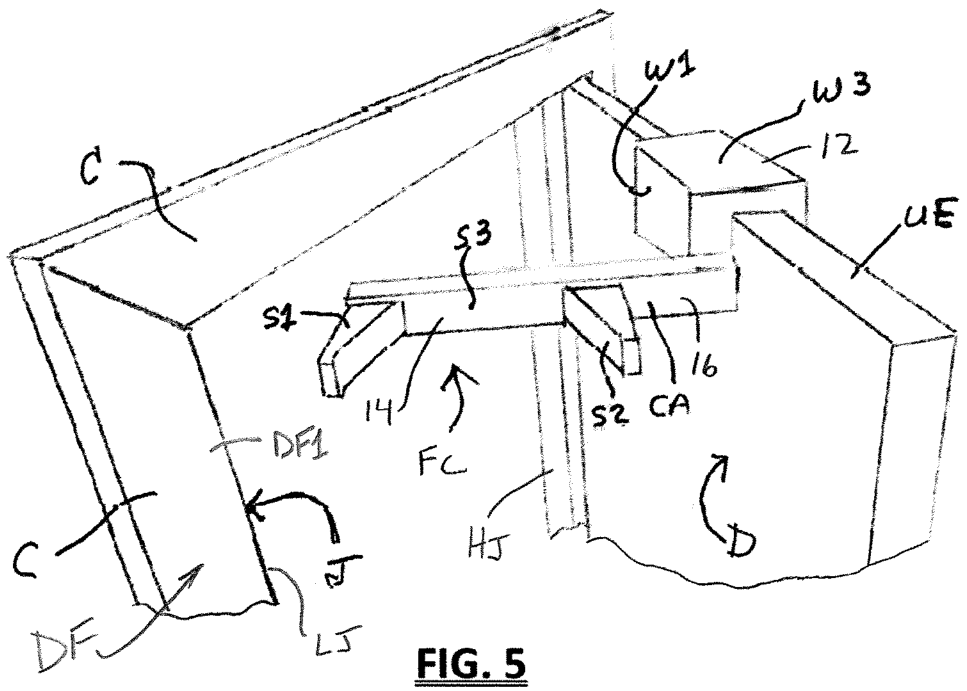
Figure 6:
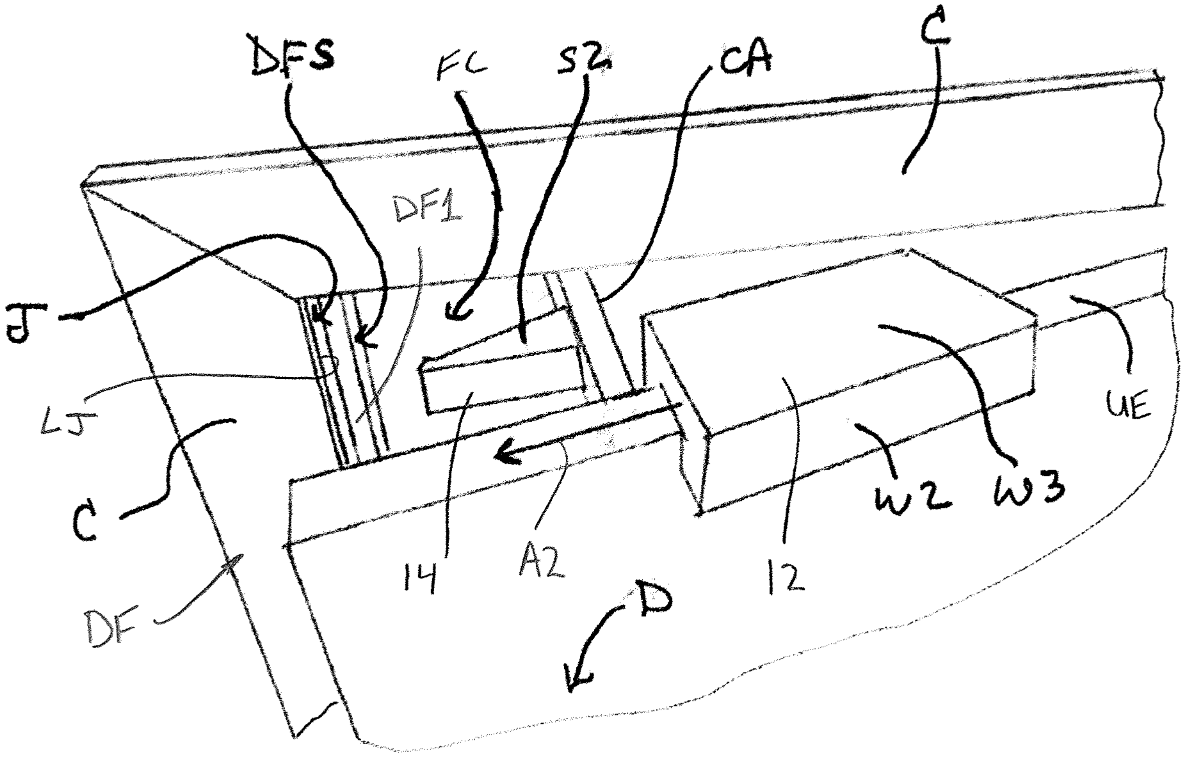
Figure 7:
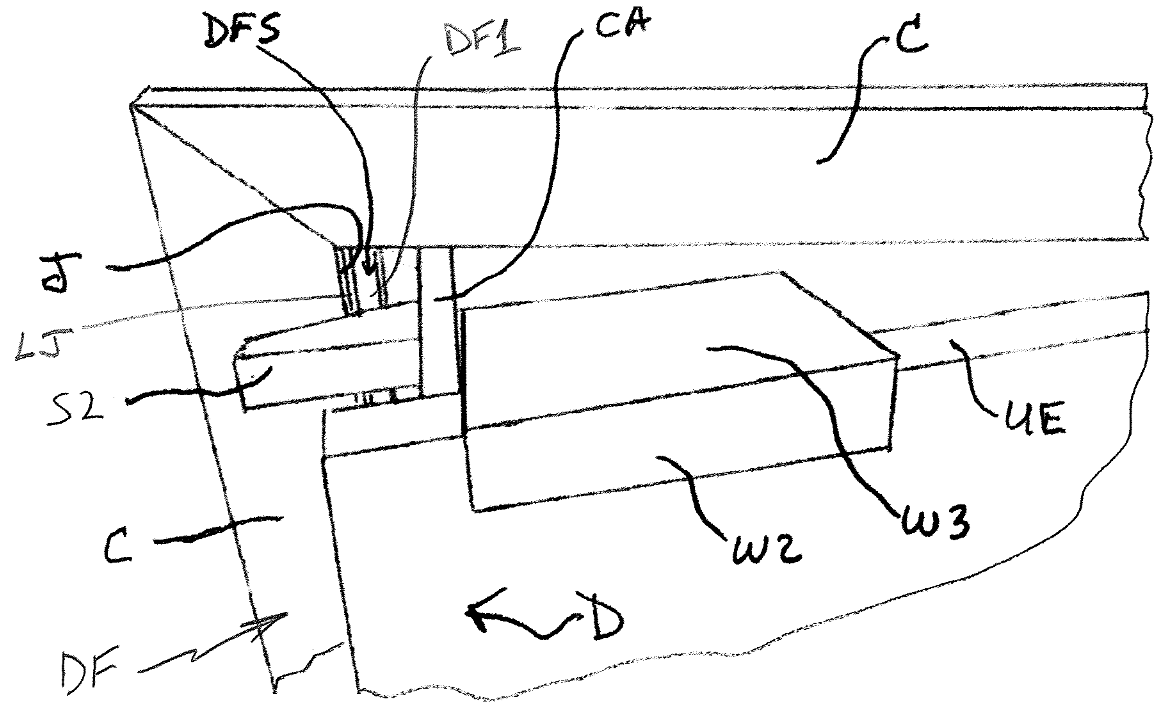
Figure 8:
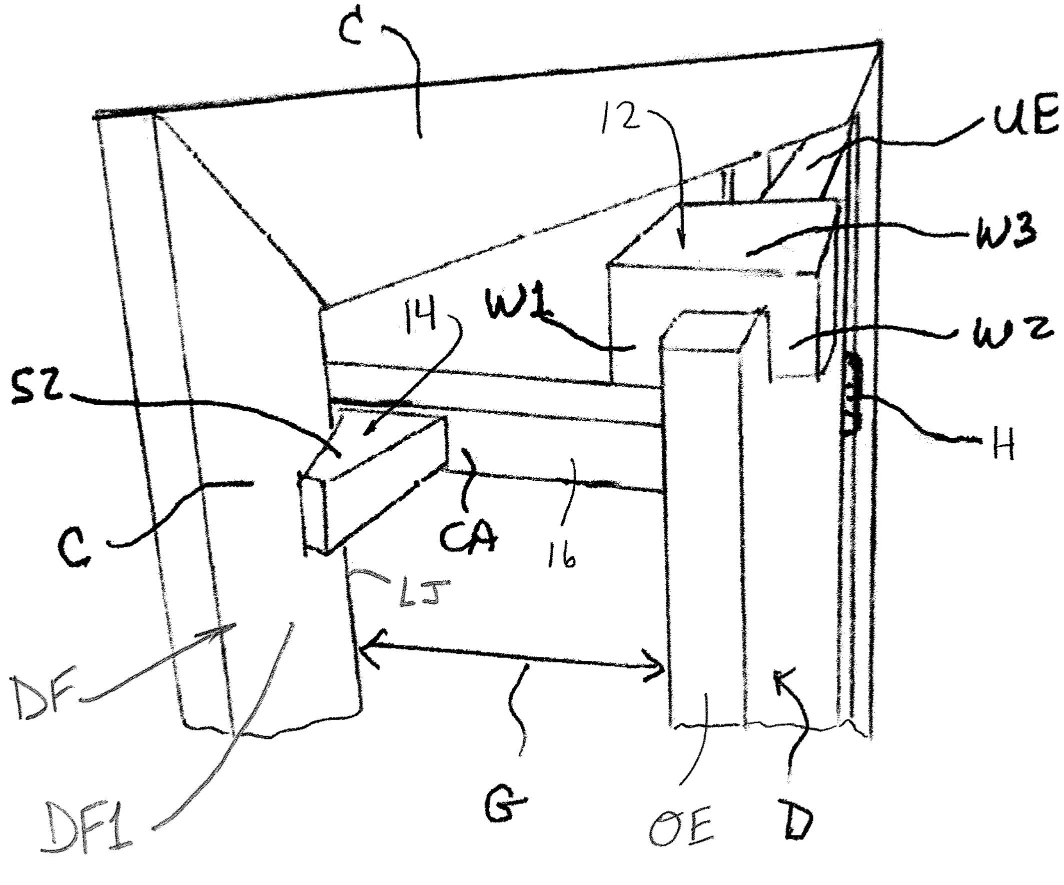

With respect to the various embodiments shown in the drawings, like reference numbers and letters are used to identify like components, often without repeating the description. A first embodiment of a door positioning device 10 provided in accordance with the present disclosure is shown in FIGS. 1-9. The device 10 allows a door D (such as a common household interior door or a household exterior door) to be held partially open in a stable and repeatable position relative to the door frame DF to which the door is pivotally connected by interlocking the top or upper edge UE of the door D with a vertical portion DF1 of the door frame DF (door jamb J and any casing C) on the side of the door frame DF that is located opposite the hinges H when the device 10 is operatively installed and located in its engaged position as shown in FIGS. 2, 7 & 8. The door D and door frame DF form part of a door unit or door installation DI. The door frame DF includes a door jamb J comprising two vertical jamb portions: (i) a hinge jamb HJ to which the hinges H are connected; and (ii) a latch jamb LJ that is arranged parallel and spaced-apart from the hinge jamb HJ and that typically includes a strike plate to be engaged by a door latch of the door (the strike plate and door latch are not shown herein). The door frame DF typically also includes an optional decorative casing C. In addition to the upper edge UE, the door D itself includes: (i) an inner lateral edge ("inner edge") IE to which the hinges H are connected to pivotally hang the door on the hinge jamb HJ; and (ii) an outer lateral edge ("outer edge") OE that is parallel to and located opposite the door inner edge IE and that is located adjacent the latch jam LJ when the door is in the closed position as shown in FIG. 3.

When the door positioning device 10 is operatively installed on the door upper edge UE and the device 10 is located in its engaged position, the device 10 is effective to secure the door D in a select, partially opened position relative to the door frame DF such that the door D cannot pivot in either an opening direction OD (door outer edge moving away from the latch jamb LJ) or closing direction CD (door outer edge moving toward the latch jamb LJ) as shown in FIG. 2. Unlike known devices, the device 10 does not use or interact with the door knob DK, the door latch, the door stop, or strike plate, and the device 10 is not permanently or semi-permanently secured to the door D or door frame DF with the use of screws or other fasteners, adhesive, or a clamping mechanism, which ensures that the device 10 does not cause any damage or mar the finish of the door D and frame DF. The immovable door positioning function provided by the device 10 is accomplished without relying on the use of pressure or friction typically found with known wedge or foot type door securement devices, and the device 10 does not engage with the floor FL.

FIGS. 2, 7, & 8 show the device 10 operatively installed on a door D and located in an engaged position in which a door engaging portion (or door section) 12 of the device 10 is engaged with and installed on the door upper edge UE and a frame engaging portion 14 of the device 10 is engaged with a first vertical door frame portion DF1 that includes the door jamb J (in particular, the latch jamb LJ portion of the door jamb J) and any optional casing members C located adjacent the latch jamb LJ that can also form part of the first door frame portion DF1. The door engaging portion 12 is connected to the frame engaging portion 14 by a connecting portion 16 such as a connecting arm CA (the combination of the frame engaging portion 14 and the connecting portion/arm 16/CA can be referred to as a frame section FS). The connecting portion 16 maintains the frame engaging portion 14 in a select fixed position relative to the door engaging portion 12, and vice versa, when the device 10 is operatively configured and installed. As described in detail below, the position of the frame engaging portion 14 on the connecting portion/arm CA can be fixed or adjustable length to allow the fixed, partially-opened position of the door D to be selected and adjusted as desired.

Figure 14:
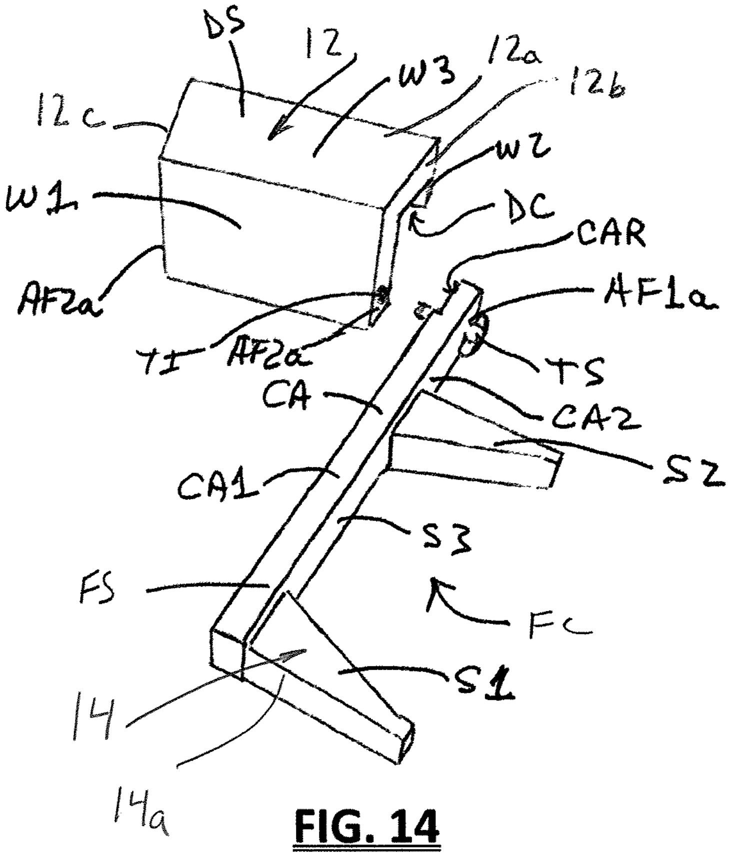
FIG. 14 is an exploded view of an alternative device provided in accordance with an embodiment of the present development.

The door engaging portion 12 of the device 10 can include at least one inverted U-shaped member 12_a_ that includes or defines a downwardly opening open door channel DC that receives the door upper edge UE, and the frame engaging portion 14 can include at least one C-shaped section 14_a_ that includes or defines a laterally opening open frame channel FC that receives and engages the first door frame portion DF1. In certain embodiments disclosed herein the frame engaging portion 14 and the connecting portion 16 such as the connecting arm CA are provided as a single one-piece structure or are assembled together as a subassembly and can be referred to as a frame section FS such as shown in FIG. 14 where a part of the connecting arm CA provides the transverse inner connecting region or inner connecting portion S3 of the C-shaped section 14_a_ of the frame channel FC, with the remainder of the C-shaped section formed by first and second spaced-apart fingers S1,S2. The door channel DC and frame channel FC are arranged to open transversely with respect to each other such as the door channel DC opening vertically downward and the frame channel FC opening horizontally or laterally when the device 10 is operatively installed on the door upper edge UE.

The door positioning device 10 can be selectively and manually moved on the door upper edge UE laterally between the door inner and outer edges IE,OE from its engaged position (FIGS. 2, 7 & 8) where it restrains and positions the door D relative to the door frame DF to its disengaged position (FIGS. 5 & 6) where the frame channel FC is disengaged from and spaced-apart from the door frame DF by manually moving/sliding the device 10 along the door upper edge UE from the engaged position toward the door inner edge IE such that the device 10 remains operatively installed on the door upper edge UE but the frame engaging portion 14 of the device 10 is disengaged from the door frame DF (i.e., the first door frame portion DF1 is released from the frame channel FC) such that the door D including the device 10 installed on its upper edge UE can freely pivot on its hinges H in the opening direction OD toward an opened position and also in the closing direction CD toward a closed position if the door engaging portion 12 is thin enough not to contact the door frame DF and interfere with movement of the door D toward and into its closed position. Alternatively, when the device 10 is located in its disengaged position as shown in FIGS. 5 & 6, the device 10 can be uninstalled from the door upper edge UE by lifting the device 10 away from the door upper edge UE to release the door upper edge UE from the door channel DC so that the door D can move freely toward and into its closed and opened positions. When the door positioning device 10 is returned to its operatively installed engaged position, the device 10 provides and enables a stable and repeatable open-door position relative to the door frame DF.

FIGS. 1,2, and 4-8 illustrate a door positioning device 10 configured for use in connection with a left-hand door installation DI (FIG. 2) in which the door D opens toward a user on the user's left. As noted, the device 10 comprises a door engaging portion 12 and a frame engaging portion 14 connected together by a connecting portion 16. The door engaging portion 12 of the device 10 can include at least one inverted U-shaped member 12_a_ that includes or defines a downwardly opening open door channel DC that receives the door upper edge UE. In particular, the at least one U-shaped member 12_a_ comprises first and second spaced-apart side walls W1, W2 (also referred to as first and second door channel side walls W1,W2) connected together by a transverse connecting wall W3 that extends between and connects the first and second side walls W1,W2. In one example, the first and second door channel side walls W1, W2 are arranged parallel with respect to each other but need not be, and the first and second door channel side walls W1,W2 are vertically oriented when the device 10 is operatively installed on the door upper edge UE. As such, the open door channel DC is defined between the first and second door channel side walls W1,W2 and has a depth defined by the transverse connecting wall W3 that also defines the door channel DC together with the first and second channel side walls W1,W2.

Figure 15:
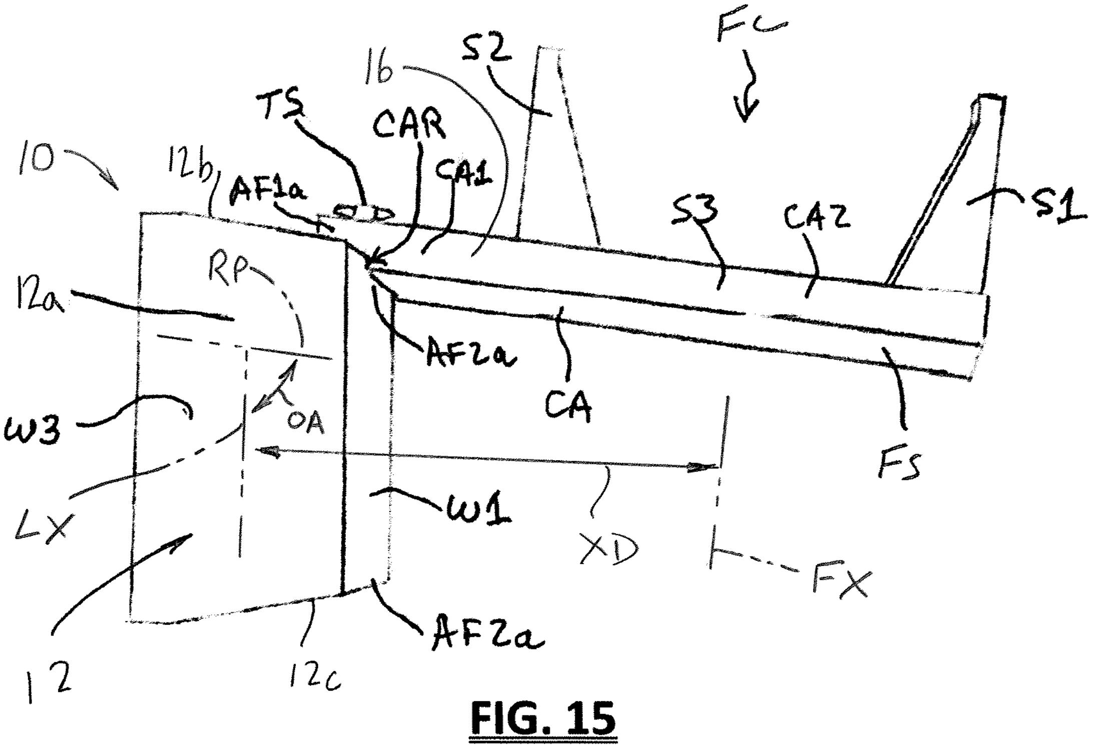
FIG. 15 shows the device of FIG. 14 configured for a left-hand door installation.

Similarly, the frame engaging portion 14 can include at least one C-shaped section 14_a_ that includes or defines a laterally opening C-shaped frame channel FC that receives and engages the first door frame portion DF1. The at least one C-shaped section 14_a_ includes first and second spaced apart fingers S1,S2 (sometimes also referred to as first and second frame channel walls S1,S2) connected together by a transverse inner connecting region S3. As noted above, in certain embodiments, the transverse inner connecting region S3 can be provided by an extension of the connecting portion 16 (connecting arm CA). The first and second frame channel fingers S1, S2 can be arranged parallel with respect to each other, or they can diverge with respect to each other as they extend outwardly away from the inner connecting region S3 to facilitate receipt in the frame channel FC of a variety of different sizes of door frames DF depending upon the depth of insertion of the door frame DF into the frame channel FC. The door channel DC and the frame channel FC are connected together by a connecting portion 16 such as the illustrated connecting arm CA. As shown in FIGS. 15, when the device 10 is operatively configured such as when the device 10 is operatively installed on a door upper edge UE (FIGS. 2 & 8), the connecting arm CA or other connecting portion 16 maintains a fixed offset distance XD and fixed orientation between a central longitudinal axis LX of the door channel DC (midway between the first and second door channel side walls W1,W2) and a frame channel central axis FX of the frame channel FC that bisects the frame channel FC midway between the first and second frame channel fingers S1,S2 (shown as being measured perpendicularly to the central longitudinal axis LX of the door channel DC). Furthermore, it is preferred that an offset angle OA of less than 90 degrees be defined between the longitudinal axis LX of the door channel DC and a reference plane RP that is oriented perpendicular to the frame channel central axis FX such that OA≤90 degrees. In one non-limiting example, the offset angle OA is inclusively in the range of 79 to 81 degrees, such as 80 degrees, but can vary without departing from the scope and intent of the present development. This offset angle OA corresponds to and accommodates the angle of the door upper edge UE relative to the first frame portion DF1 when the device 10,10' is in its operative engaged position to secure the door D in the partially opened position. In the illustrated embodiment, the connecting arm CA is fixed length but it can alternatively be adjustable in length and, in such case, be selectively fixed at a desired length, and/or the position of the frame channel FC on the connecting arm CA can vary.

FIGS. 1, 2, and 4-8 show the door positioning device 10 configured for use with a left-hand door installation DI as shown in FIGS. 2 & 3 in which the door D opens toward a user on the user's left side. The door installation DI as shown in FIGS. 2 & 3 typically comprises a door D that can include a door knob DK, a door frame DF which comprises two vertical jambs (the hinge jamb HJ and latch jamb LJ) and one horizontal head jamb HJ, at least two hinges H that attach the door D to the hinge jamb HJ of the door frame DF. The door frame DF can be attached to a wall W. The door frame DF can include door trim casings C attached to the door frame and wall on at least one or typically both sides (the inside and outside) of the door. For purposes of the present disclosure, the first door frame portion DF1 can comprise the latch jamb LJ and any adjacent casings C that may be present and that are received in the frame channel FC of the device 10 together with the latch jamb LJ when the device 10 is operatively installed and arranged in its engaged position.

Figure 9:
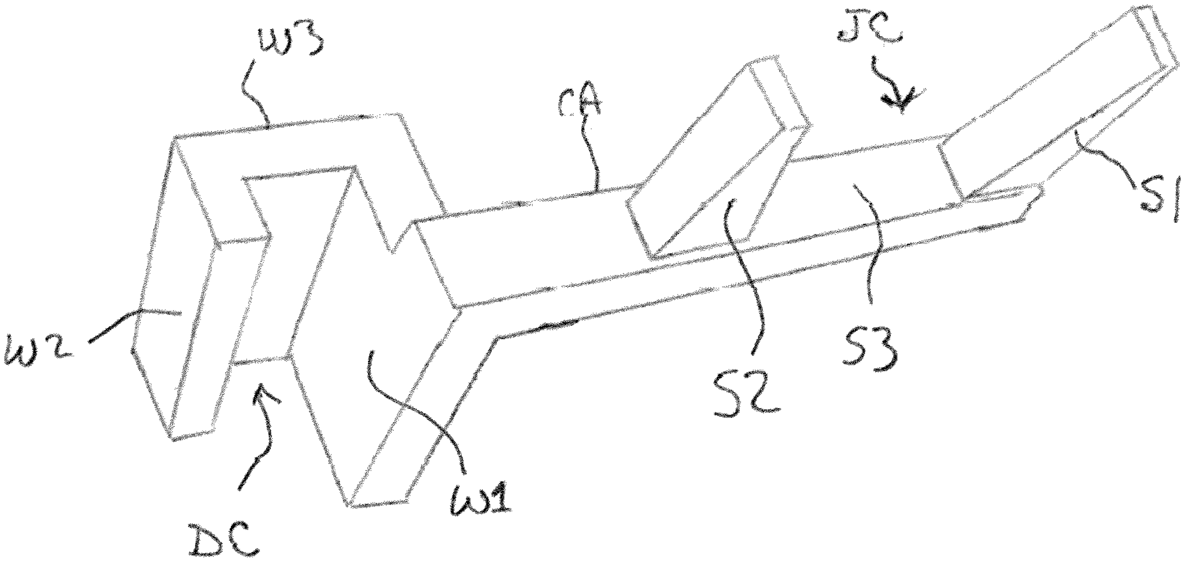
FIG. 9 shows an alternative embodiment configured for use with a right-hand door installation.

FIG. 9 shows a door positioning device 10' that is identical to the door positioning device 10 except that it is configured to be operatively installed on and used in connection with a right-hand door installation including a door D that opens toward the user from the user's right side. Like reference numbers & letters are used to described like components and structures without further description.

Figure 9A:
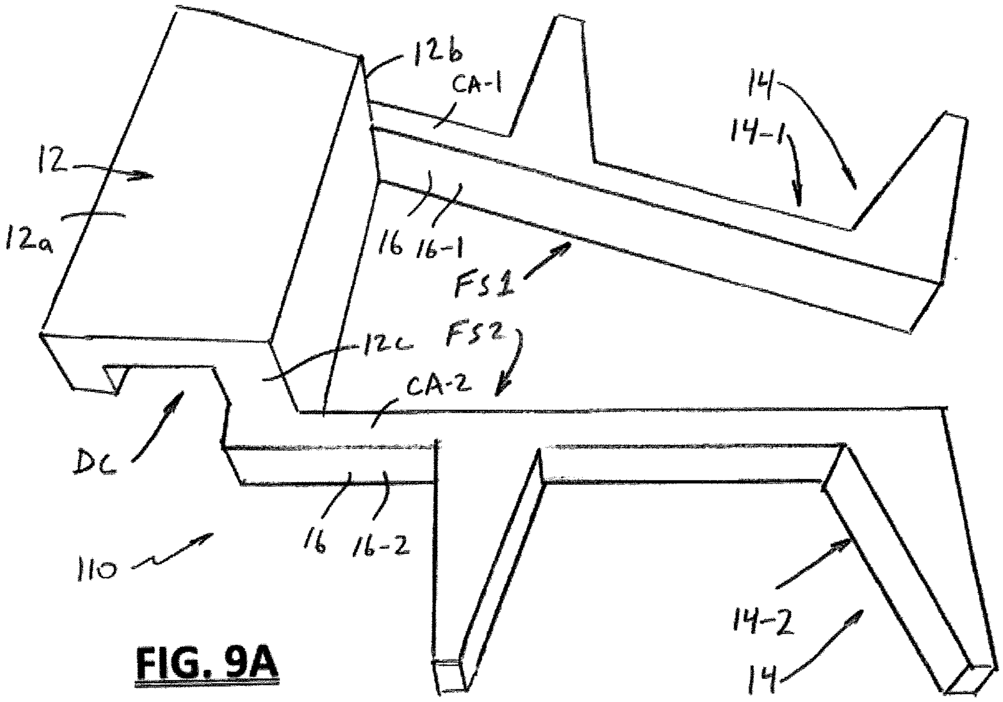
FIG. 9A shows another alternative door positioning device configured to be operatively installed on and used on the door of both a left-hand door installation and a right-hand door installation.

FIG. 9A shows another alternative door positioning device 110 that is identical to the door positioning device 10,10' except that it is configured to be operatively installed on and used in connection with both a left-hand door installation DI including a door D that opens toward the user from the user's left side and a right-hand door installation including a door D that opens toward the user from the user's right side. Like reference numbers & letters relative to the device 10, 10' are used to describe like components and structures without further description. In particular, the device 110 comprises a door engaging portion 12 and both first and second frame sections FS1,FS2 connected to the door engaging portion 12 engaging portion. As with the device 10,10', the door engaging portion 12 of the device 110 can include at least one inverted U-shaped member 12*a* that includes or defines a downwardly opening open door channel DC that receives the door upper edge UE. The U-shaped member 12*a* includes opposite first and second axial ends 12*b*,12*c*. The first frame section FS1 comprises a first frame engaging portion 14 (14-1) connected to a first axial end 12*b* of the door engaging portion 12 by a first connecting portion 16 (16-1) such as the illustrated first connecting arm CA-1. The second frame section FS2 comprises a second frame engaging portion 14 (14-2) connected to an opposite second axial end 12*c* of the door engaging portion 12 by a second connecting portion 16 (16-2) such as the illustrated second connecting arm CA-2. The first and second frame engaging portions 14-1,14-2 are oriented in opposite directions with respect to each other and open outwardly away from each other such that: (i) the first frame engaging portion 14-1 is oriented to operatively receive and engage a vertical portion of the door frame DF when the device 110 is operatively installed on the upper edge UE of the door D of a left-hand door installation and the device 110 is moved to its engaged position; and (ii) the second frame engaging portion 14-2 is oriented to operatively receive and engage a vertical portion of the door frame DF when the device 110 is operatively installed on the upper edge UE of the door D of a right-hand door installation and the device 110 is moved to its engaged position. Either one or both of the connecting arms CA-1,CA-2 can optionally be removably attached to the door engaging portion 12 using attachment features AF1,AF2 as described below.

The door positioning device 10,10' can be manufactured as a one-piece structure or as an assembly of multiple pieces or subassemblies. In either case, the device 10,10' can be constructed from wood, metal, rigid cardboard, molded fiber, polymeric resin (plastic), and/or any other suitable materials and combinations thereof.

Figure 4:
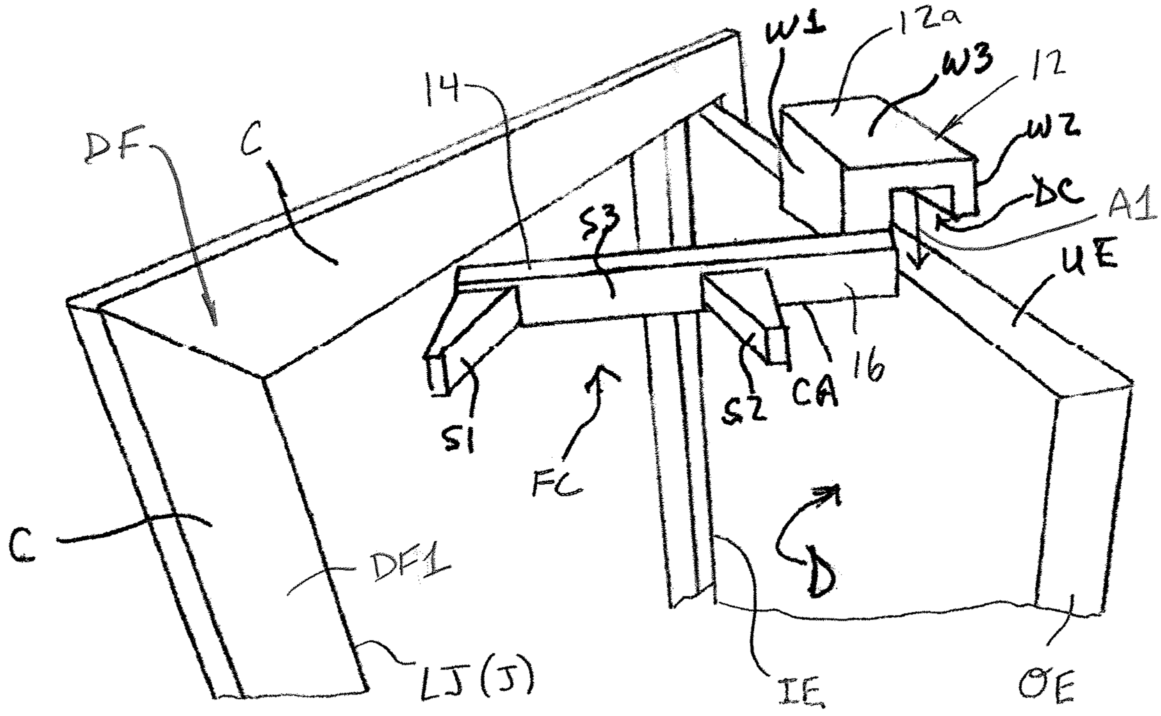
FIGS. 4-8 show the device of FIG. 1 being operatively installed on a door.

To use the door positioning device 10 (and also the device 10'), the door engaging portion 12 is first engaged with the door upper edge UE such that the door upper edge UE is received in the door channel DC as shown in FIGS. 4 & 5 and indicted by the arrow A1 such that the device 10 is operatively installed on the door upper edge UE. As shown in FIG. 6, the device 10 is then slid along the door upper edge UE away from the door inner edge IE toward the door outer edge OE as indicated by the arrow A2 until the latch jamb LJ and other portions of the first door frame portion DF1 (such as casings C) are received in the frame channel FC so that the frame channel FC captures the door frame DF (first door frame portion DF1) therein. The connecting portion 16, shown herein as a connecting arm CA, maintains a fixed offset distance XD and fixed position between the door engaging portion 12 and frame engaging portion 14 such that when the device 10 is in its operative engaged position, a controlled gap G (FIG. 8) is established and maintained between the outer edge OE of the door D and latch jamb LJ or other part of the first frame portion DF1. The length of the connecting arm CA between the door engaging portion 12 and the frame engaging portion 14 determines the size of the controlled gap G between the door jamb LJ and the door D as represented in FIG. 8. For the purpose of allowing a small animal, such as a cat, to pass through, the connecting arm CA or other connecting portion 16 can be dimensioned such that the gap G is set to a range of 4 inches to 5 inches. In one non-limiting example, the connecting arm CA or other connecting portion 16 is dimensioned such that the gap G is in the range of 4.3 inches to 4.5 inches such as, e.g., 4.4 inches (11 cm).

In one embodiment, the door engaging portion 12, frame engaging portion 14, and connecting arm/portion 16 are all defined together as a single, one-piece construction such as a molded or formed polymeric structure or a molded fibrous structure or a additively manufactured (3-D printed) structure or a stamped, cast, and/or otherwise formed metal structure or the like. Alternatively, the door positioning device 10 including the door engaging portion 12, frame engaging portion 14, and connecting arm/portion 16 comprises two or more separate pieces that are selectively assembled or connected together to define the door positioning device 10.

Figure 10:
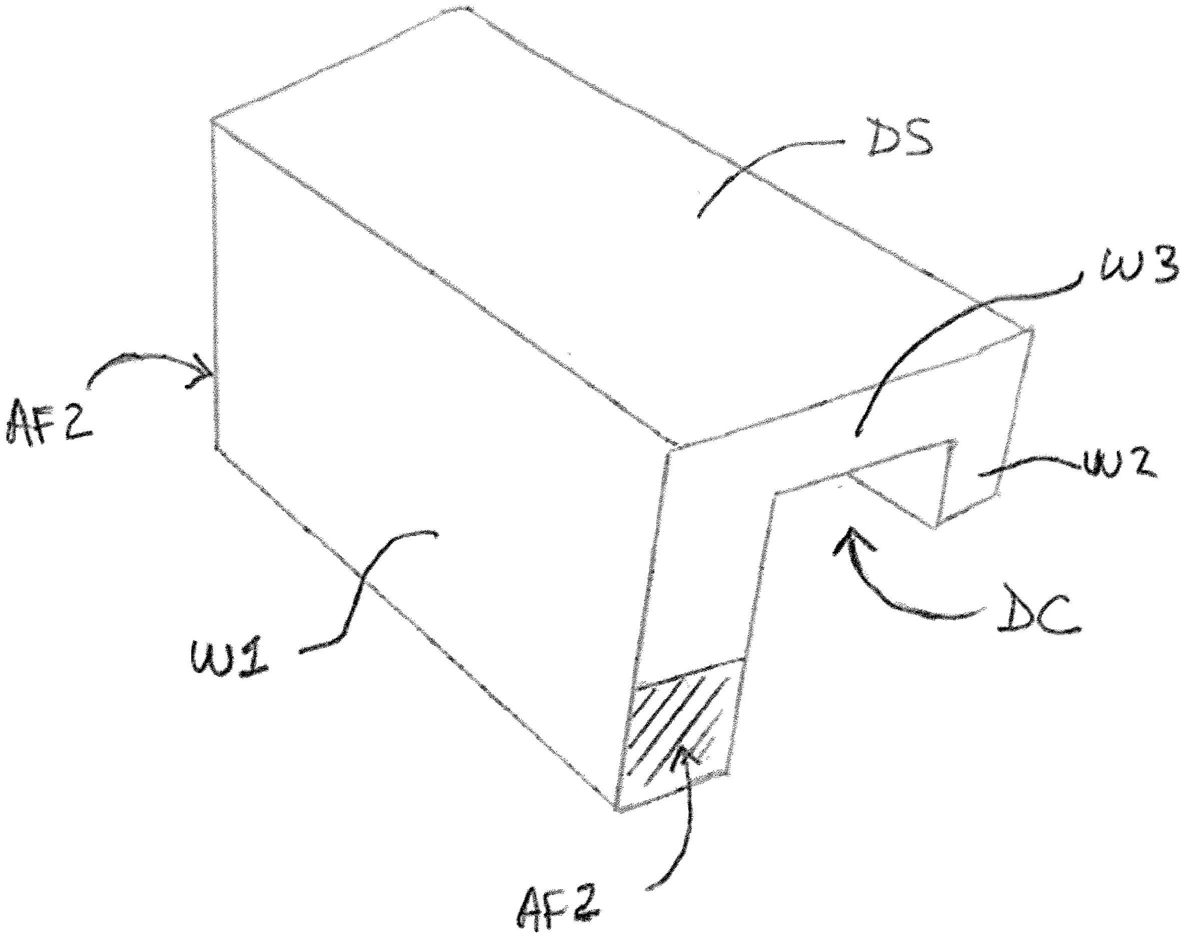
FIG. 10 shows a door engaging portion of the device.
Figure 11:
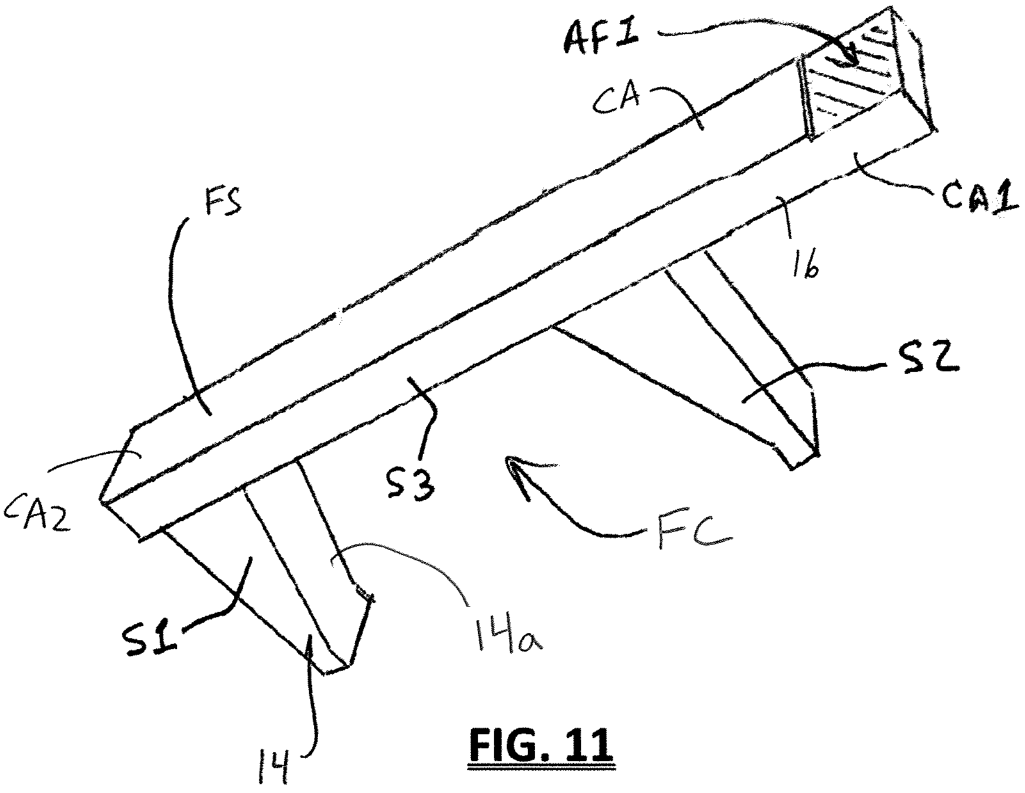
FIG. 11 shows a frame section portion of the device including both a frame engaging portion and a connecting portion.

FIGS. 10 & 11 show that the device 10 can comprise two separate sections or more. The door engaging portion 12 (FIG. 10) can comprise an open door slot or channel DC such as the illustrated example of an inverted U-shaped member 12*a* including the door channel DC defined between the side walls W1, W2 and connecting wall W3 that closely receives the upper edge UE of the door D therein with minimal clearance while preferably still allowing the door engaging portion 12 to be slid along the door upper edge UE as described when the door upper edge UE is positioned in the door channel DC. Similarly, the C-shaped section 14*a* of the frame engaging portion 14 and the connecting arm 16 of the connecting portion 16 can be defined as a different one-piece (FIGS. 20,22,31,32) or multi-piece structure or assembly (FIGS. 33-37, 38-42) and can be referred to together as a frame section FS. As noted, the C-shaped member 14*a* defines a frame channel FC that closely receives the first door frame portion DF1 including the latch jamb LJ therein with minimal clearance. As shown, the frame channel FC comprises first and second spaced-apart fingers S1, S2 connected together by a transverse inner connecting region S3. In some embodiments, the transverse inner connecting region S3 comprises part of the connecting portion 16 (connecting arm CA). The frame engaging portion 14 and the door engaging portion 12 are connected together by the connecting portion 16 such as the connecting arm CA that includes a first end CA1 connected to the door engaging portion 12 and an opposite second end CA2 connected to and optionally forming part of the frame engaging portion 14. The connecting arm CA maintains the door engaging portion 12 and the frame engaging portion 14 in a fixed position and orientation relative to the other in some embodiments and allows adjustment of the distance between the door engaging portion 12 and the frame engaging portion 14 in other embodiments.

In one example, the first end CA1 of the connecting arm CA is formed with a primary attachment feature AF1 represented in FIG. 11 and the door engaging portion 12 is formed with at least one mating secondary attachment feature AF2 represented in FIG. 10 by which the connecting arm CA (and the frame engaging portion 14 connected thereto to form the frame section FS) can be connected to the door engaging portion 12.

Figure 12:
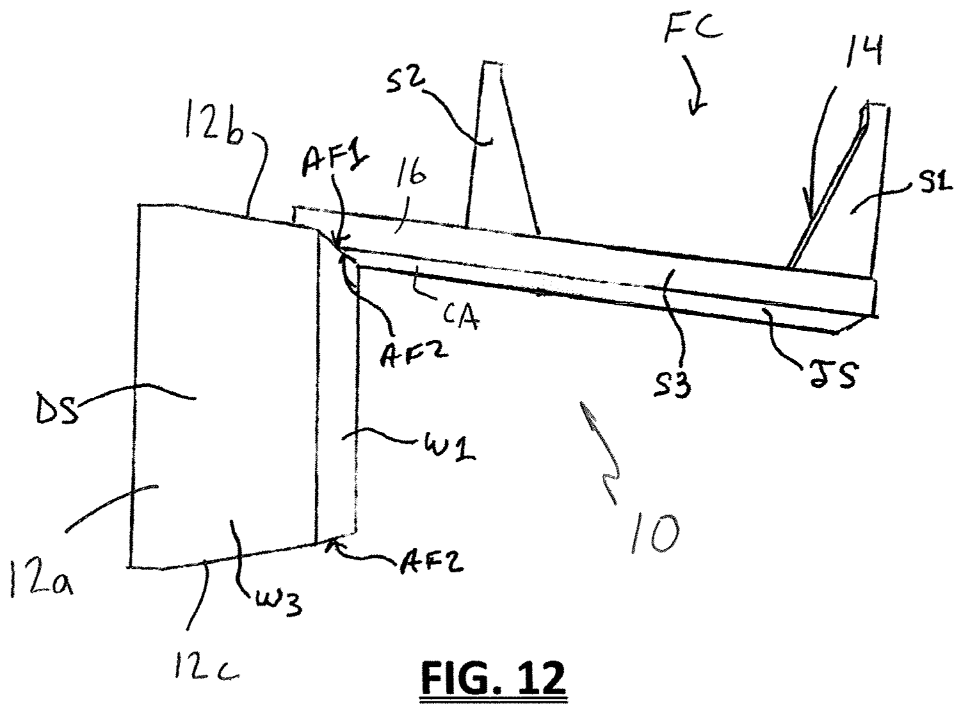
FIG. 12 shows the frame section of FIG. 11 connected to a first end of the door engaging portion of FIG. 10 to configure the device for a left-hand door installation.
Figure 13:
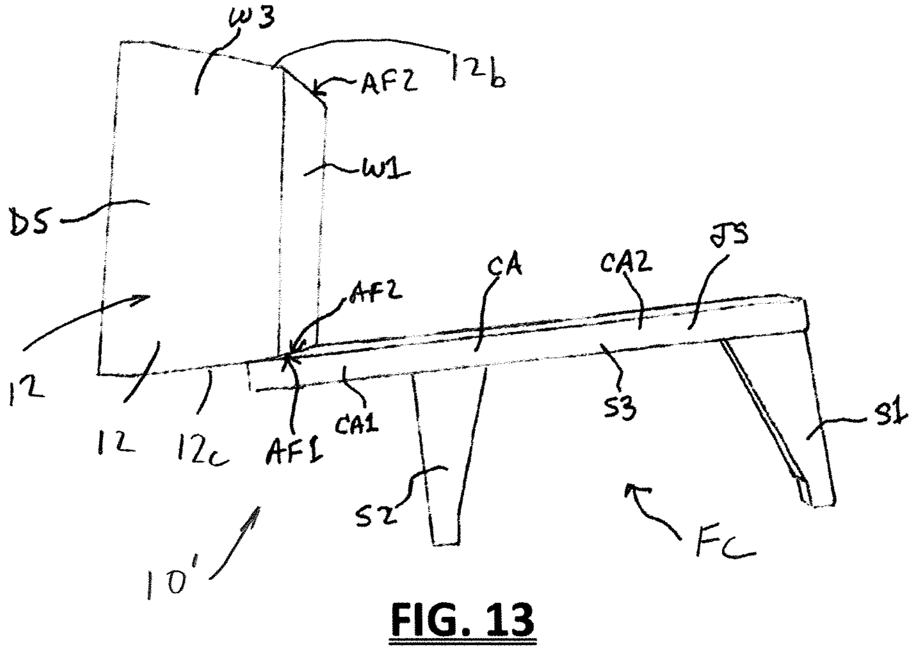
FIG. 13 shows the frame section of FIG. 11 connected to a second end of the door engaging portion of FIG. 10 to configure the device for a right-hand door installation.

Represented in FIGS. 12 & 13, in one example, the door engaging portion 12 is provided with first and second secondary attachment features AF2 located respectively on the opposite first and second axial ends 12*b*,12*c* thereof such that the door positioning device is configured to secure a left-hand door unit when the primary attachment feature AF1 of the connecting arm CA is connected to a first secondary attachment feature AF2 located on the first end 12*b* of the door engaging portion 12 to form the door positioning device 10 (see FIG. 12) and is configured to secure a right-hand door unit when the connecting arm CA is reversed or flipped/mirrored in orientation and the primary attachment feature AF1 of the connecting arm CA is alternatively connected to the second secondary attachment feature AF2 located on the opposite second end 12*c* of the door engaging portion 12 to form the door positioning device 10' (see FIG. 13).

Figure 16:
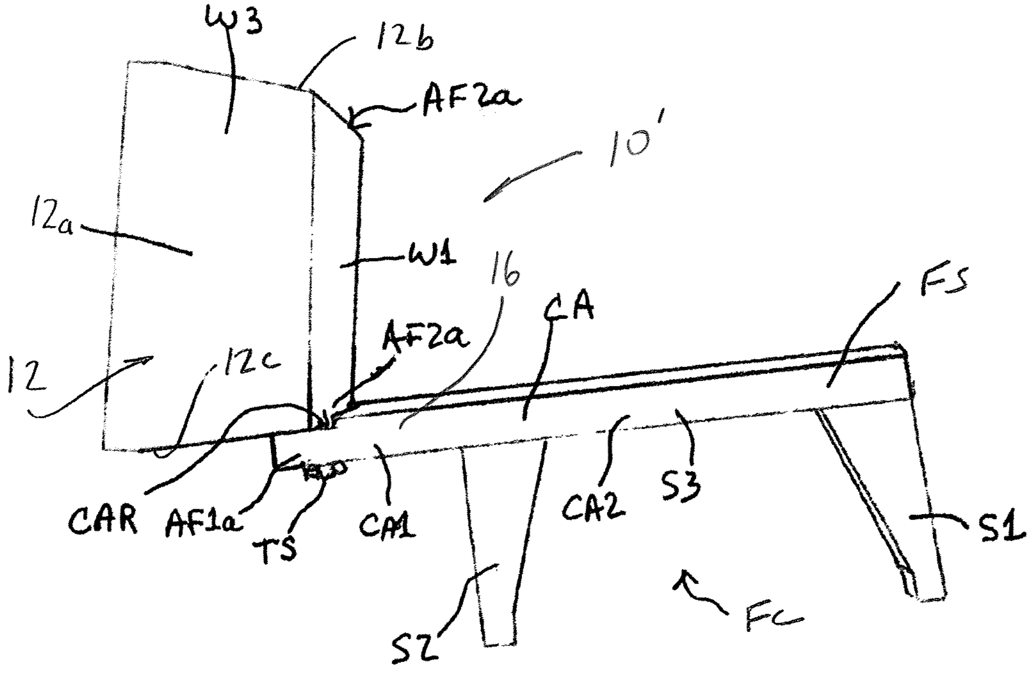
FIG. 16 shows the device of FIG. 14 configured for a right-hand door installation.

The door positioning device 10 may be implemented with but not limited to two pieces, a door engaging portion 12 and a frame engaging portion 14 that includes the connecting arm CA or other connecting portion 16, that can attach to each other forming a complete unit. Attachment features of varying types on these two sections can allow for implementation on either a left-hand or right-hand door unit/installation DI with the same two sections. In one example as shown in FIGS. 14-16 the frame engaging portion 14 and the connecting arm 16 are provided as a structure or assembly that is connected to the door engaging portion 12 using a threaded fastener that secures the first end CA1 of the connecting arm CA to the first or second end 12*b*,12*c* of the door engaging portion 12. In such case, the attachment feature AF2*a* of the door engaging portion 12 can comprise a threaded insert TI and the attachment feature AF1*a* of the door connecting arm CA can comprise a threaded fasteners such as a thumbscrew TS. The attachment feature AF1*a* of the connecting arm CA can further comprise a connecting arm recess CAR (FIGS. 14-16) that receives part of the door engaging portion 12 therein to provides rotational stability of the connecting arm CA relative to the door engaging portion 12 when the thumbscrew TS is securely tightened to the threaded insert TI to form a door positioning device 10 or 10'. In this example, a door positioning device 10 for a left-hand door unit is represented in FIG. 15. FIG. 16 shows that a door positioning device 10' for a right-hand door unit is formed when the connecting arm CA is flipped over and secured to the opposite end 12*c* of the door engaging portion 12 utilizing attachment features AF1*a* and AF2*a*.

Figure 17:
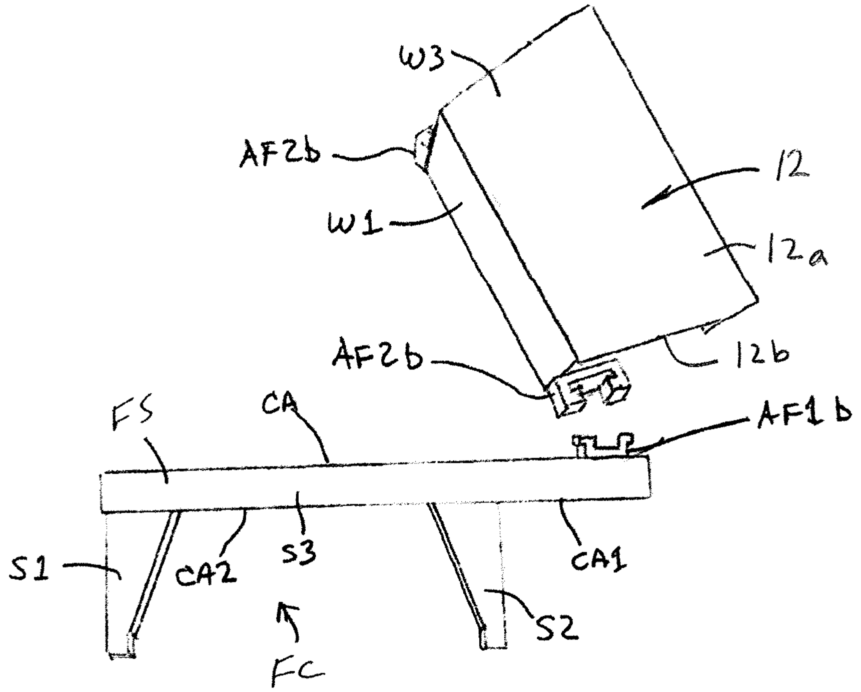
FIG. 17 is an exploded view of an alternative device provided in accordance with an embodiment of the present development.
Figure 18:
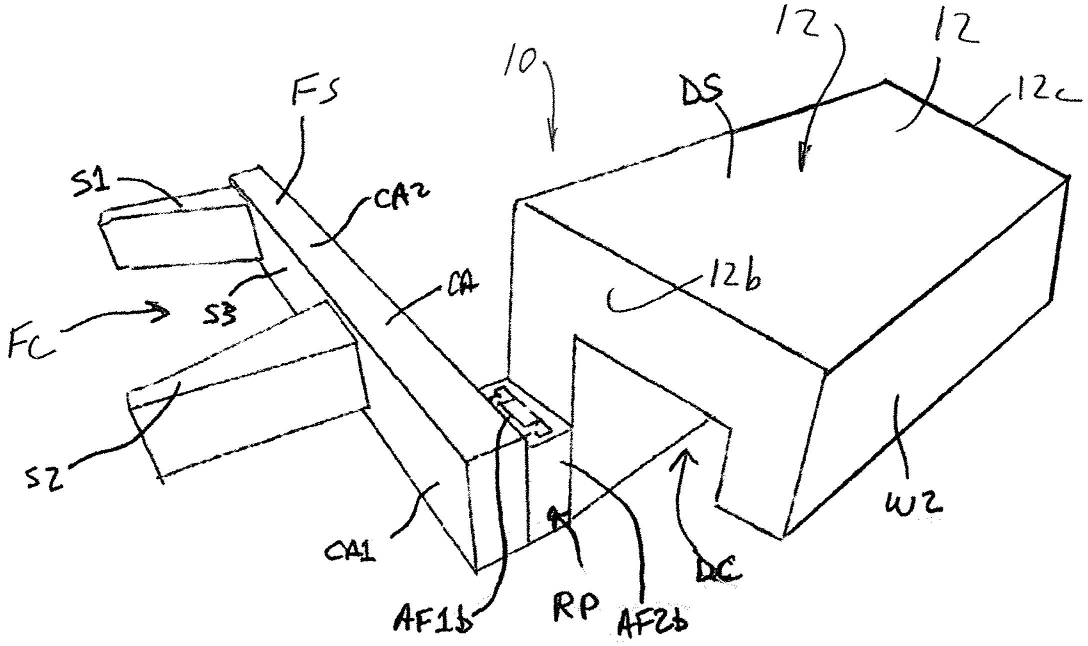
FIG. 18 shows the device of FIG. 17 configured for a left-hand door installation.
Figure 19:
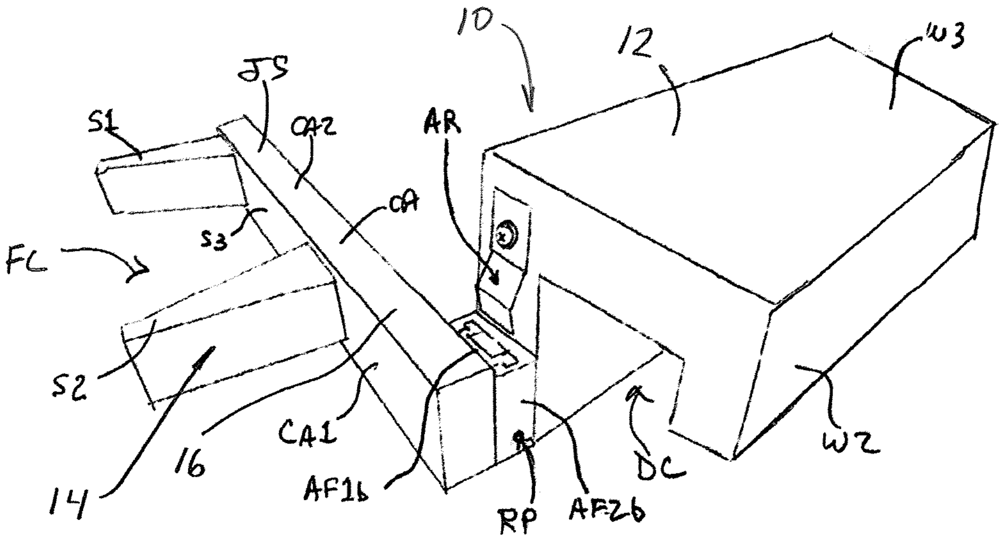
FIG. 19 is similar to FIG. 18 but shows the device as including an optional connecting arm retainer/release mechanism.

Alternatively, as another example shown in FIGS. 17 & 18, the first and second attachment features AF1*a*,AF2*a* are respectively replaced with alternative first and second attachment features AF1*b*,AF2*b*. The first attachment feature AF1*b* comprises a C-shaped channel structure (such as an aluminum or polymeric extrusion) mounted on the first end CA1 of the connecting arm CA and the second attachment feature AF2*b* comprises a T-shaped slot structure (such as an aluminum or polymeric extrusion) mounted on at least one and preferably both the opposite first and second ends 12*b*,12*c* of the inverted U-shaped member 12*a* of the door engaging portion 12 and that closely slidably receives the C-shaped channel structure AF1*b* (the C-shaped channel structure AF1*b* can be replaced by a T-shaped rib structure of extruded polymeric resin material or aluminum that is closely slidably received in the T-shaped slot structure AF2*b*). The attachment features AF1*b*,AF2*b* can be respectively secured to the door engaging portion 12 and the connecting arm CA using screws or other suitable fasteners of fastening means such as an adhesive. When mated as shown in FIG. 18, a roll pin RP or other pin or fastener extends thru the wall of the T-shaped slot structure AF2*b* and engages the C-shaped channel structure AF1*b* to fixedly secure the mated attachment features AF1*b*,AF2*b* to each other. As noted, the connecting arm CA and the frame engaging portion 16 connected to the second end CA2 thereof can be flipped over or reversed and the attachment feature AF1*b* mated with the attachment feature AF2*b* located at the opposite end 12*b*,12*c* of the door engaging portion 12 to form a door positioning device for a right-hand door unit. The second attachment feature AF2*b* can further comprise an optional resilient connecting arm retainer/release mechanism AR made from a resilient metal or polymeric material that, in its free or unrestrained position, blocks sliding separation of the first attachment feature AF1*b* (and the connecting arm CA) from the second attachment feature AF2*b*. The connecting arm retainer/release mechanism AR is shaped to be deflected inwardly by contact with the first attachment feature AF1*b* during mating of the first attachment feature AF1*b* with the second attachment feature AF2*b*. The connecting arm retainer/release mechanism AR can be selectively manually depressed to allow separation of the first and second attachment features AF1*b*, AF2*b*.

Figure 20:
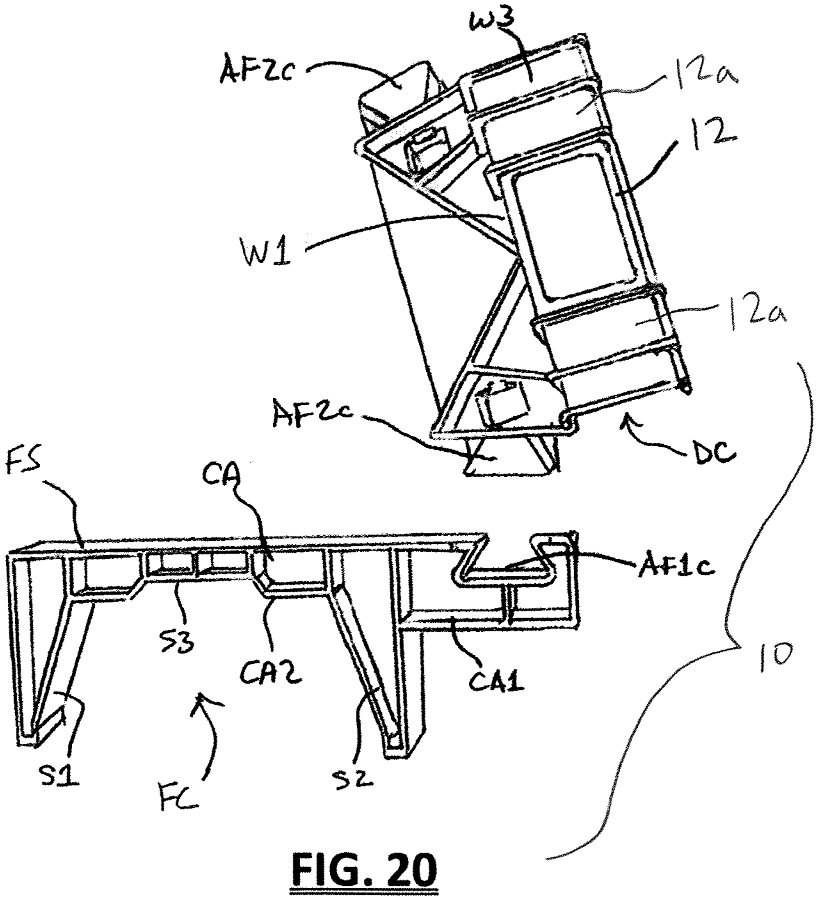
FIG. 20 is an exploded view of an alternative device provided in accordance with an embodiment of the present development.
Figure 21:
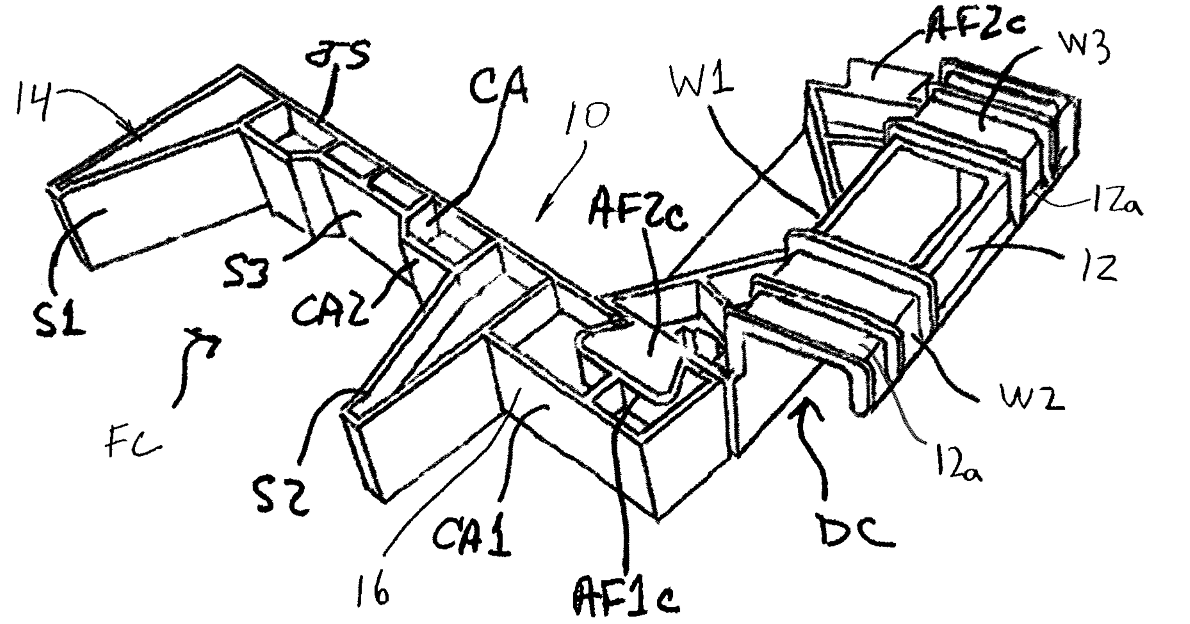
FIG. 21 shows the device of FIG. 20 configured for a left-hand door installation.

FIGS. 20 & 21 shown another alternative example of the device 10 wherein the connecting arm 16 that is connected to the frame engaging portion 14 comprises a female dove tail first attachment feature AF1*c* and the inverted U-shaped member 12*a* of the door engaging portion 12 comprises a male dove tail second attachment feature AF2*c* at each opposite axial end 12*b*,12*c*. In one non-limiting example, the door engaging portion 12, frame engaging portion 14, and connecting arm 16 can each be manufactured as an injection molded structure. As shown herein the door engaging portion 12 is provided as a first unitary injection molded structure and the frame engaging portion and connecting arm are provided together as a second unitary injection molded structure. As described above, the device 10 can be configured for use with either a left-hand door installation or a right-hand door installation depending upon whether the first attachment feature AF1*c* is mated with the second attachment feature AF2*c* located in the first end 12*b* or the second end 12*c* of the door engaging portion 12.

Figure 22:
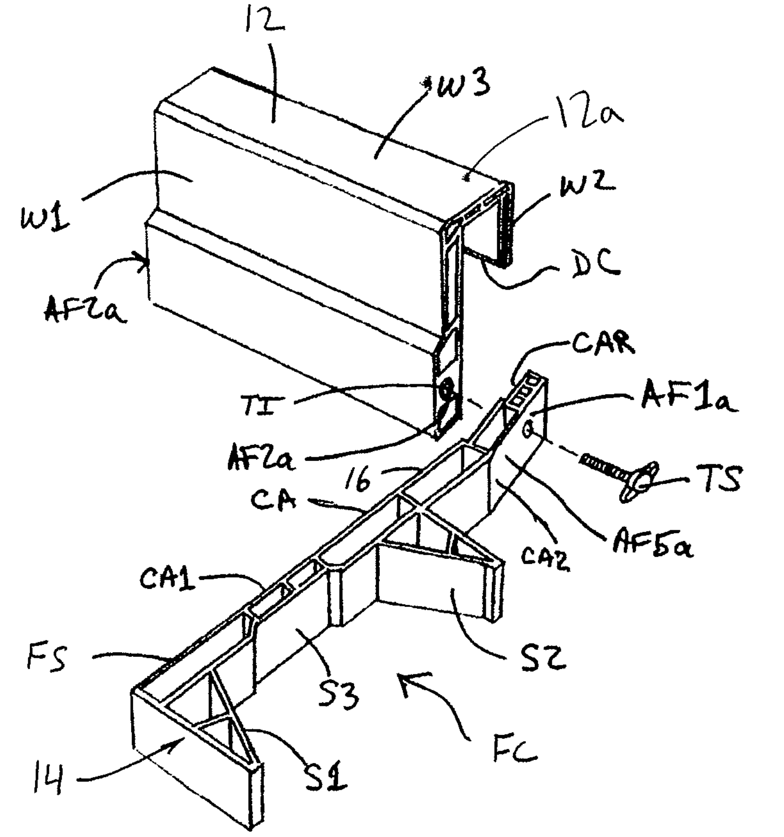
FIG. 22 is an exploded view of an alternative device provided in accordance with an embodiment of the present development.
Figure 23:
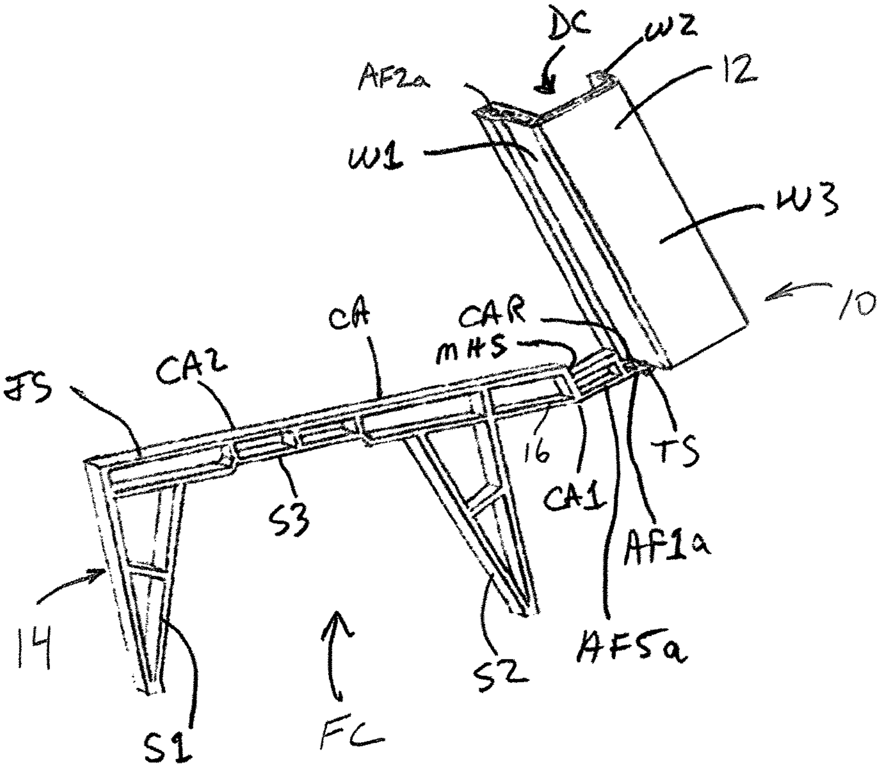
FIG. 23 shows the device of FIG. 22 configured for a left-hand door installation.
Figure 24:
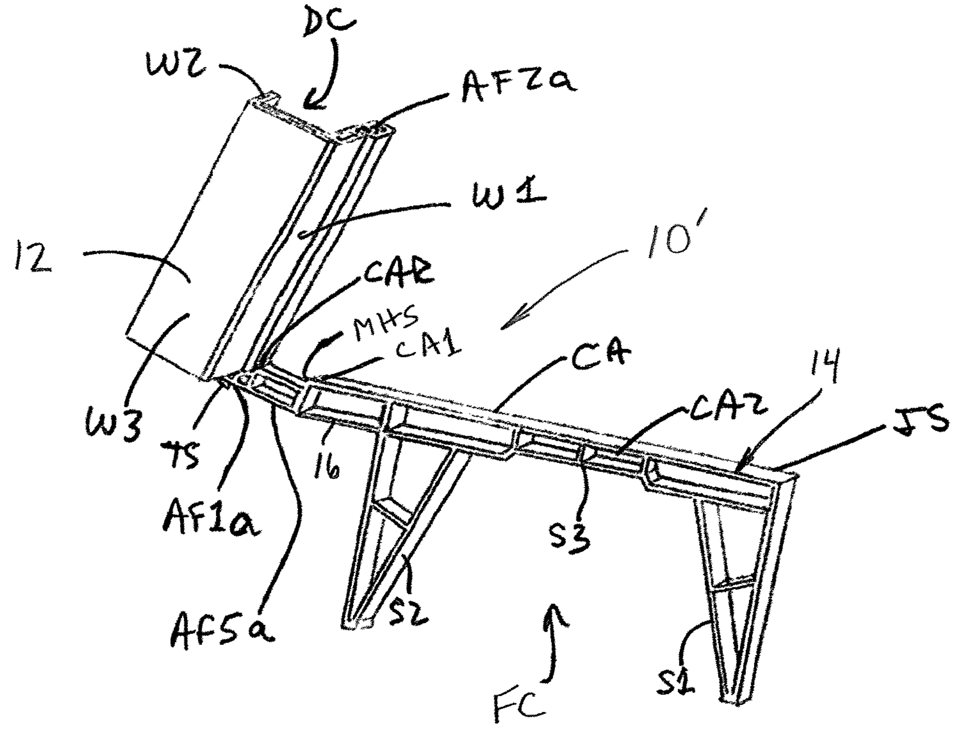
FIG. 24 shows the device of FIG. 22 configured for a right-hand door installation.

As another example, FIGS. 22-24 illustrate a device 10 wherein the door engaging portion 12 is provided as a monolithic structure comprising a first unitary polymeric extrusion and the frame engaging portion 14 and connecting arm 16 are provided as a monolithic frame section FS comprising a second unitary polymeric extrusion. As shown, the attachment features AF2*a* comprise threaded inserts TI and the attachment feature AF1*a* of the connecting arm CA comprises thumbscrew TS and a connecting arm recess CAR. As described above, the device 10 can be configured for use with either a left-hand door installation or a right-hand door installation depending upon whether the first attachment feature AF1*a* is mated with the second attachment feature AF2*a* located in the first end 12*b* or the second end 12*c* of the door engaging portion 12.

Figure 25:
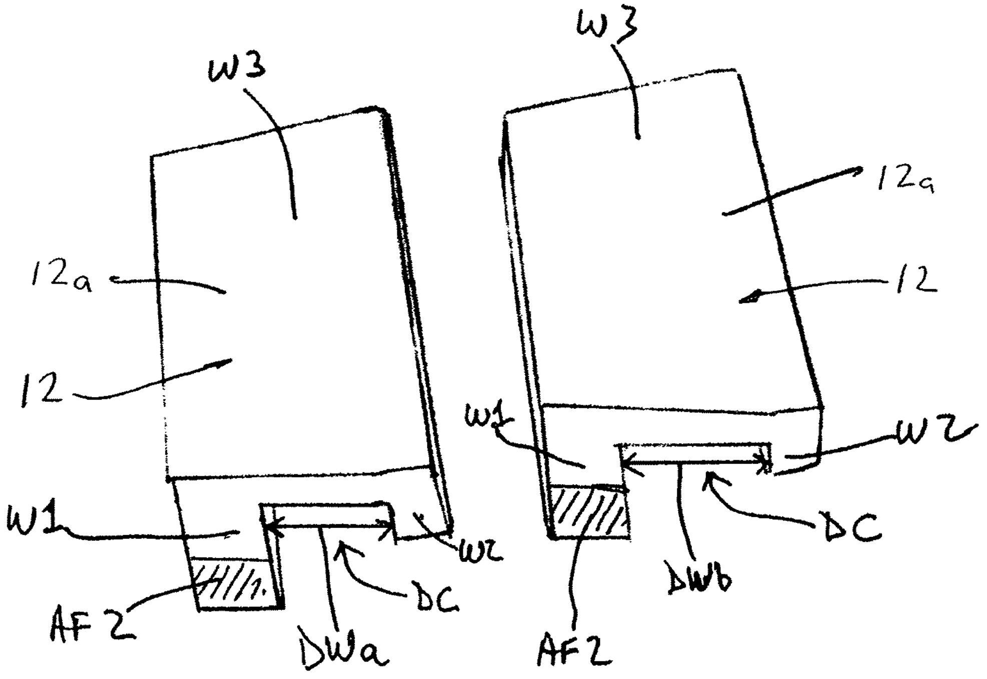
FIGS. 25-29 respectively show alternative embodiments of a door engaging portion of a device provided in accordance with the present development.
Figure 26:
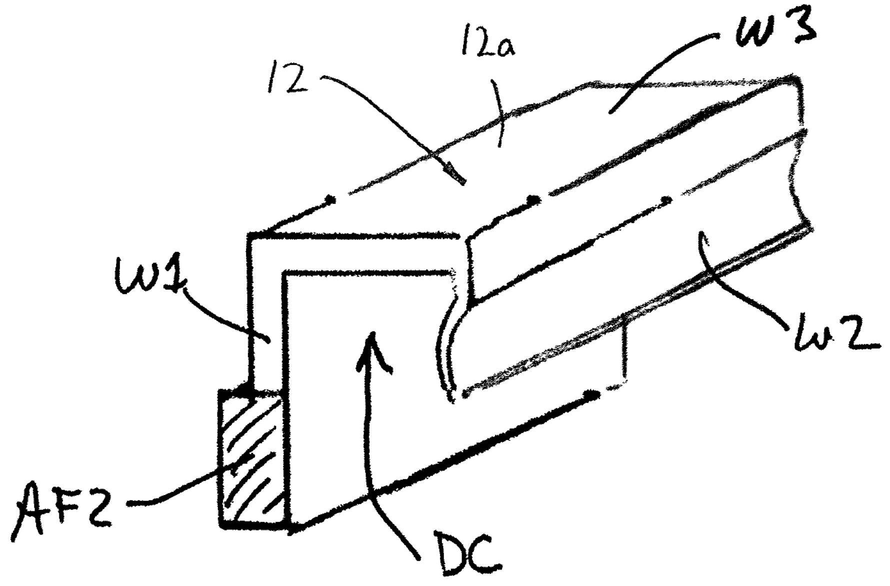
Figure 27:
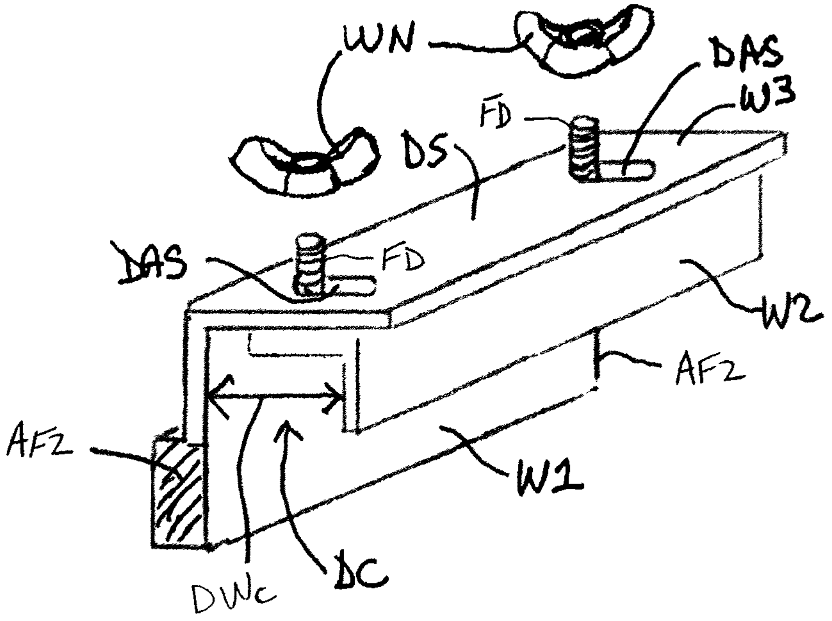
Figure 28:
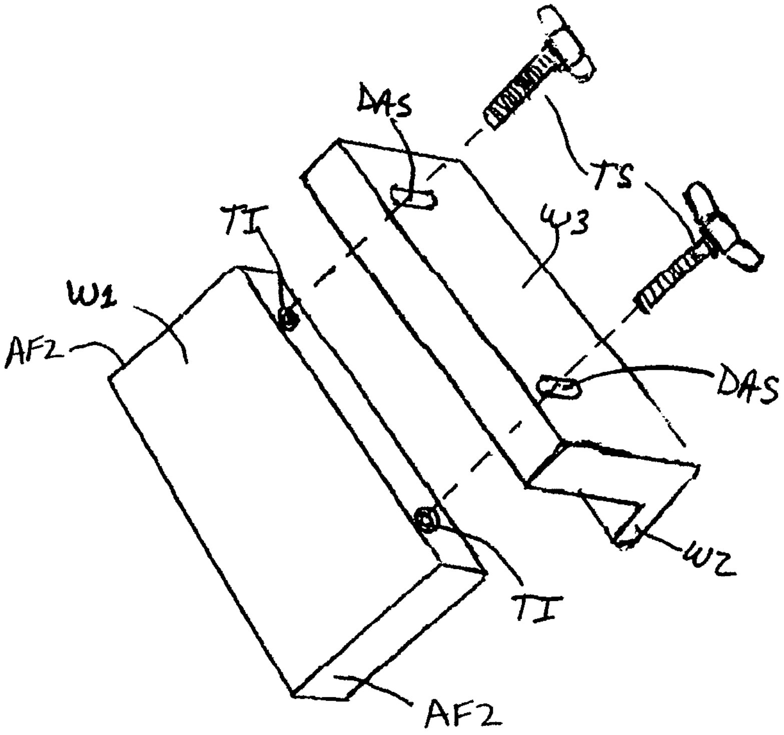
Figure 29:
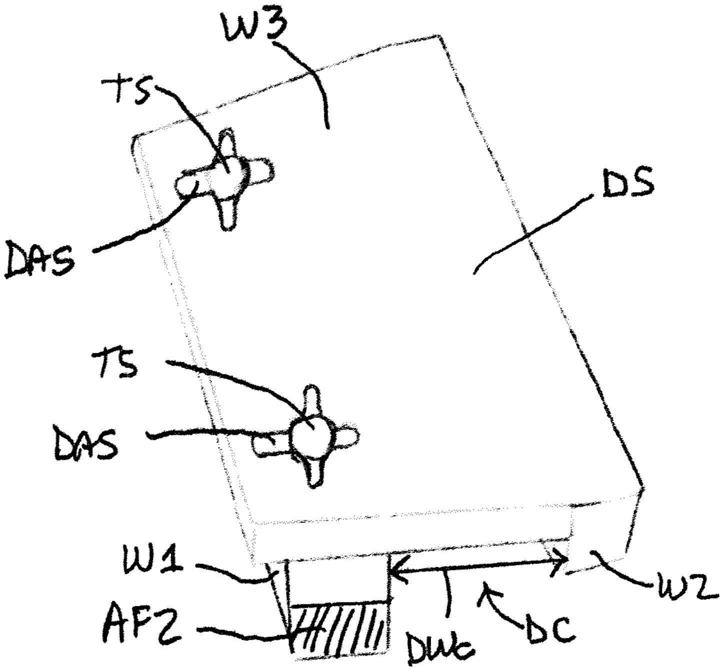

The door engaging portion 12 of a door positioning device 10, may include various features that address variations in door thickness but not be limited to:

- the ability to accommodate a fixed door thickness, for example represented in FIG. 25 wherein the door channel DC can be defined with a fixed width DWa to receive a nominal door width of 1-3/8 inches (35 mm) and or a fixed width DWb to receive a nominal door width of 1-3/4 inches (45 mm);
- the ability to accommodate multiple different door widths (such as both of the widths DWa,DWb described above and others) by provided the second side wall W2 as a resiliently compliant wall as shown in FIG. 26 such that the second side wall W2 can resiliently flex outwardly away from the first side wall W1 to accommodate variations/tolerances in a standard door thickness, for example 1-3/8 inch or 35 mm nominally with ±1/16 inch (±1.5 mm) variation, or variations in nominal door thicknesses from 1-3/8 to 1-3/4 inches (35 mm to 45 mm);
- the ability to accommodate multiple different door widths (such as both of the widths DWa,DWb described above and others) by comprising a second side wall W2 that is movably connect to the connecting wall W3 (FIG. 27) via fasteners FD received in elongated door width adjustment slots DAS defined in the connecting wall W3 and secured by nuts WN such that the second side wall W2 is selectively movable toward and away from the first side wall W1 to adjust the door channel width DWc of the door channel DC. An alternate structure is represented in FIGS. 28 & 29 where the first side wall W1 is adjustably movable with respect to the connecting wall W3 toward and away from the second side wall W2 via elongated door adjustment slots DAS defined in the connecting wall W3 that receive fasteners TS (such as thumb screws) that are engaged with the first side wall W1 such as with threaded inserts TI thereof, and wherein the second side wall W2 and connecting wall W3 are connected to each other such as by being assembled together or defined together as a one-piece construction.

Figure 30:
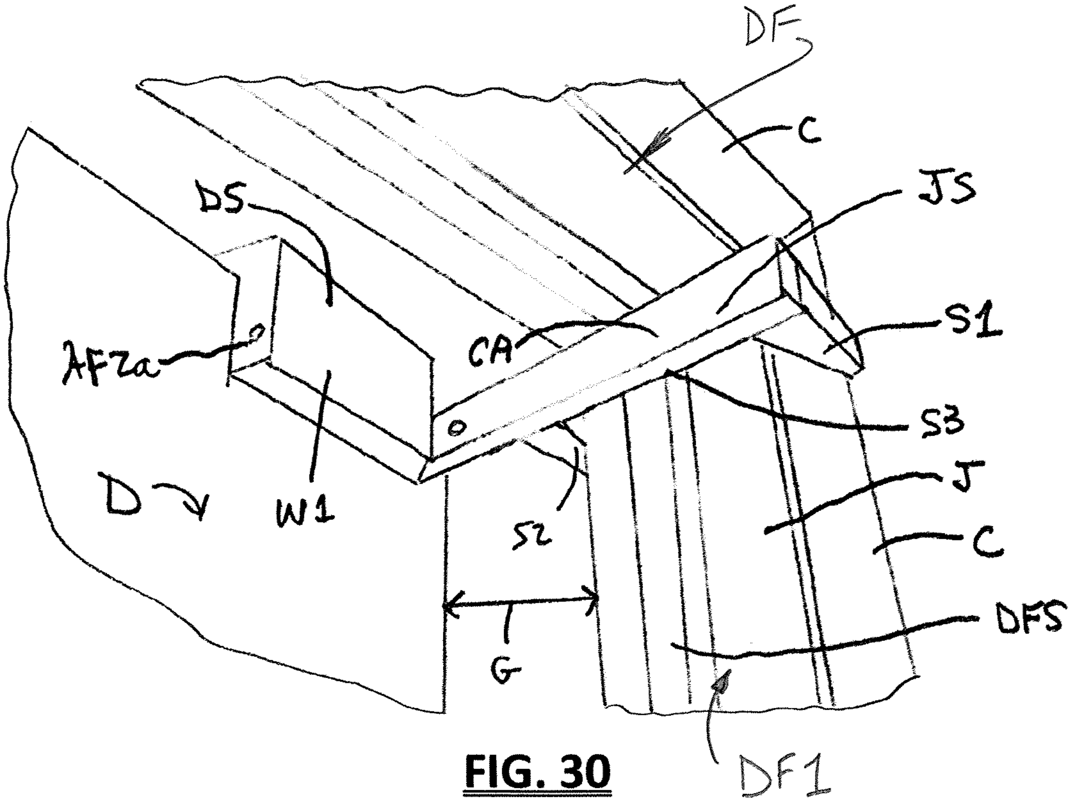
FIG. 30 shows a device provided in accordance with the present development operatively installed and engaged on a left-hand door unit (door installation).
Figure 31:
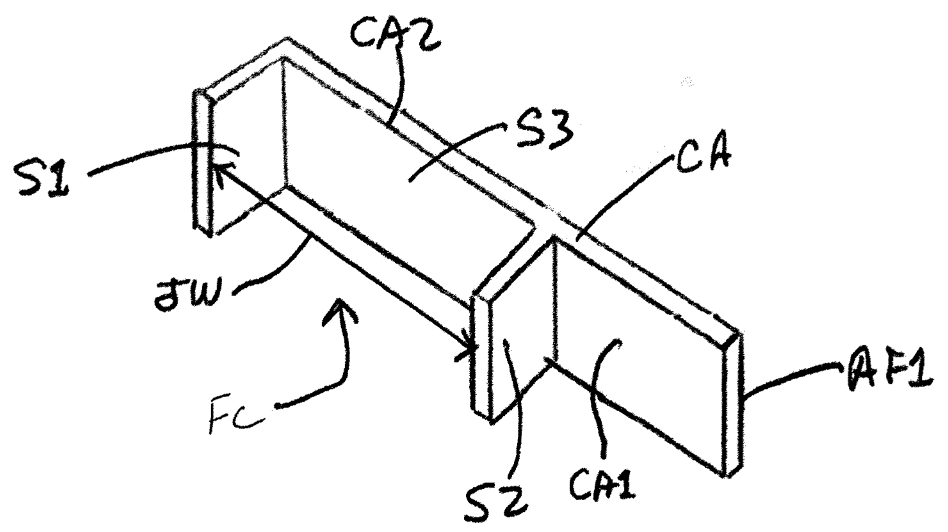
FIGS. 31-37 respectively show alternative embodiments of a frame engaging section of a device provided in accordance with the present development.
Figure 32:
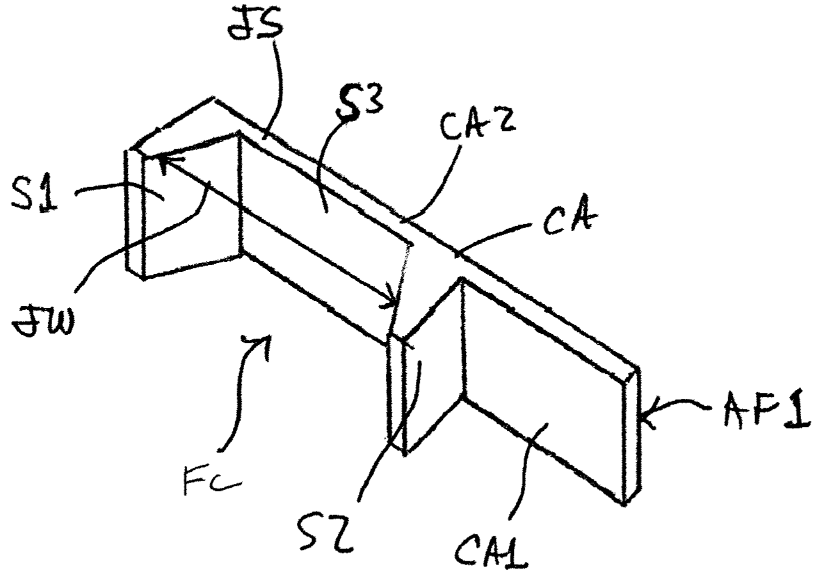
Figure 33:
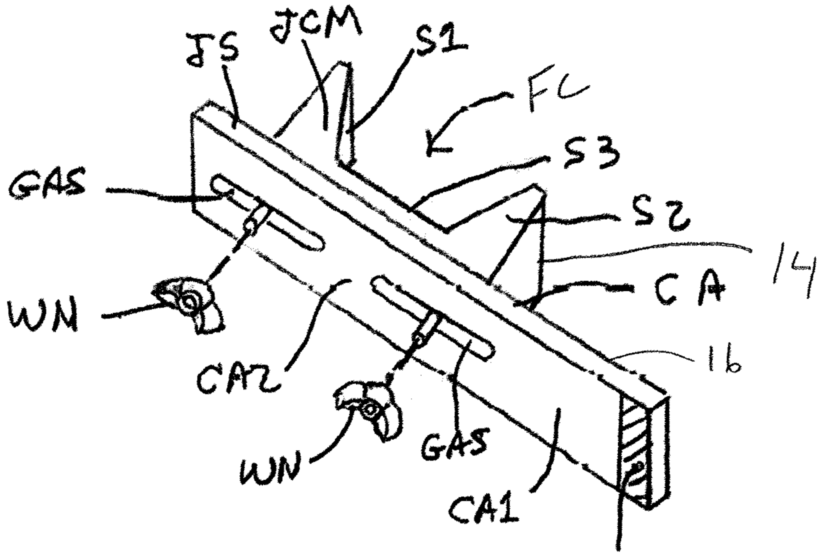

Door installations DI will often be finished off by attaching door trim, commonly known as casings represented in FIG. 30, to the door frame DF on both the inside and outside adjoining walls to hide the gap between the door frame DF and surface of the wall. There are a multitude of casings available that would need to be accommodated for the frame engaging portion 14 of a door positioning device to work effectively. Typical door jambs J are 4-9/16 inch wide to accommodate walls built from standard 2×4s (typically 1½×3½ inches) with ½ inch thick drywall attached to both wall surfaces. Casings can easily vary from but not be limited to ¼ inch to ¾ inch thick at the face of the door jamb J when attached to the door frame and wall surfaces. FIG. 30 is an example of a frame channel FC formed by first and second fingers S1, S2 and connecting portion S3 mating up against a first door frame portion DF1 with casings C attached. Ideally, a gap remains between the connecting portion S3 and the door stop DFS for the first and second fingers S1 and S2 of the frame engaging portion 14 to closely receive the door frame DF1 with casings C therein with minimal clearance.

The frame engaging portion 14 of a door positioning device 10, may optionally include features that accommodate variations in the width of the first door frame portion DF1 defined by the latch jamb LJ and any casings C such as, for example:

(FIG. 31) a connecting arm CA of a fixed length with the frame channel FC defining a fixed frame channel width JW implemented of any various means formed by the first and second fingers S1, S2 arranged in parallel with respect to each other as they extend outwardly from the inner connecting portion S3 to facilitate receipt of a door jamb J plus casing(s) C therein into the frame channel FC.

(FIG. 32) a connecting arm CA of a fixed length with the frame channel FC defining a range of frame channel widths JW by the first and second fingers S1, S2 being arranged to diverge with respect to each other as they extend outwardly from the inner connecting region S3 to facilitate receipt of a door frame portion DF1 therein of a variety of different sizes, for example but not limited to a 4¾ to 6¼ inch range, depending upon the depth of insertion of the door frame portion DF1 into the frame channel FC.

(FIG. 33) an independently moveable frame engaging portion 14 with parallel or diverging first and second fingers S1,S2 that is adjustably positioned on the connecting arm CA such as by use of one or more elongated gap adjustment slots GAS defined in the connecting arm CA and fasteners FG extending through the slots GAS and secured with nuts WN or similar such that altering the position of the frame engaging portion 14 on the connecting arm CA alters the size of the door gap G provided by use of the device 10, for example a 3-to-5-inch range for the gap G, i.e., the position of the frame engaging portion 14 on the connecting arm CA controls the size of the door gap G.

Figure 34:
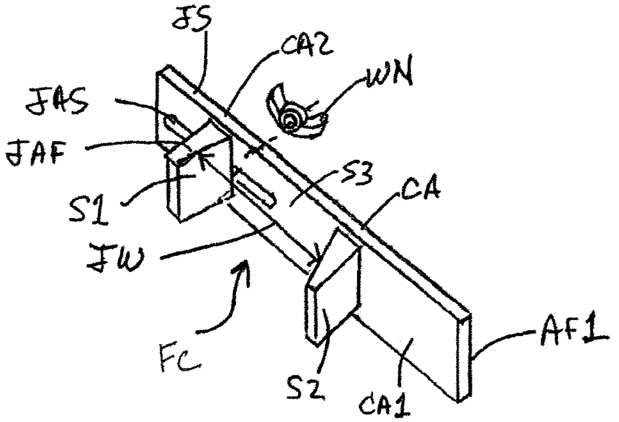
Figure 35:
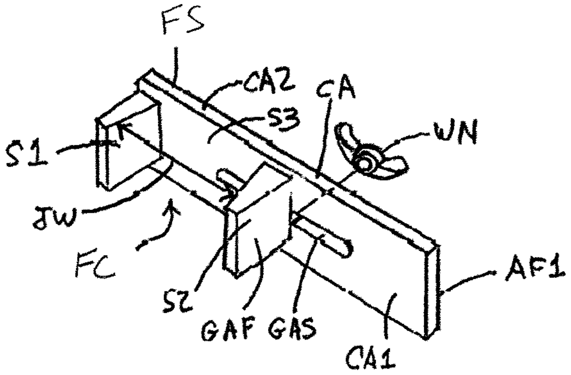
Figure 36:
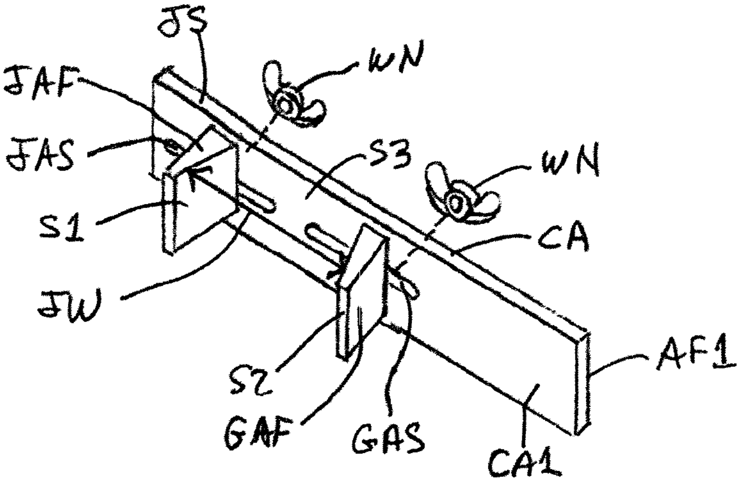

(FIG. 34) An individually moveable jamb channel adjustment finger JAF providing the first finger S1, a second finger S2 extending outwardly from and fixed to an inner connecting region S3 forming a frame channel FC implemented of any various means (FIG. 34 represents one such means). The jamb channel adjustment finger JAF is slidably connected or engaged to the connecting arm CA of fixed length by means of a fastener that extends through an elongated jamb channel adjustment slot JAS defined in the connecting arm CA and the fastener can be fastened via nut WN or the like, such that a frame channel width JW defined between the first and second fingers S1,S2 is adjustable by changing the position of the jamb channel adjustment finger JAF on the connecting arm CA to accommodate a range of door jamb plus casing(s) width to facilitate receipt of a door jamb J plus casing(s) C therein of a variety of different sizes and provides a non-adjustable door to door jamb gap G.

(FIG. 35) An individually moveable gap adjustment finger GAF provides the second finger S2, and the first finger S1 extends outwardly from and is fixed to an inner transverse region S3 forming a frame channel FC. The gap adjustment finger GAF is slidably connected or engaged to the connecting arm CA of fixed length by means of a fastener that extends through an elongated gap adjustment slot GAS defined in the connecting arm CA and the fastener can be secured using a nut WN or the like to allow a frame channel width JW to be adjusted to accommodate a range of door jamb plus casing(s) widths to facilitate receipt of a door frame portion DF1 therein of a variety of different sizes. Altering the position of the gap adjustment finger GAF also inherently adjusts the size of the door gap G established by the device 10.

(FIG. 36) An individually moveable jamb channel adjustment finger JAF providing the first finger S1 and an individually moveable gap adjustment finger GAF providing the second finger S2, extending outwardly from an inner transverse connecting region S3 forming a frame channel FC. The gap adjustment finger GAF can be slidably connected or engaged to the connecting arm CA of fixed length by means of a fastener that extends through in an elongated gap adjustment slot GAS that can be fastened with a nut WN to allow a door gap G adjustment, for example but not limited to a 3-½ to 4-½ inch range. The jamb channel adjustment finger JAF is also slidably connected to or engaged to the same connecting arm CA by means of a fastener that extends through an elongated jamb channel adjustment slot JAS that can be fastened with a nut WN to allow a frame channel width JW adjustment relative to the secured gap adjustment finger GAF to accommodate a range of door jamb plus casing(s) width to facilitate receipt of a door frame portion DF1 therein of a variety of different sizes, for example but not limited to a 4-½ to 6-½ inch range.

Figure 37:
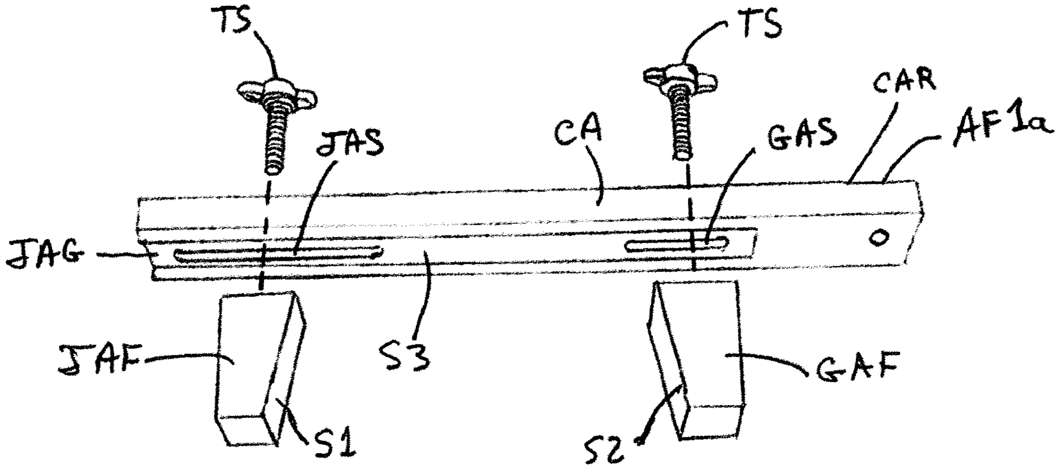
Figure 38:
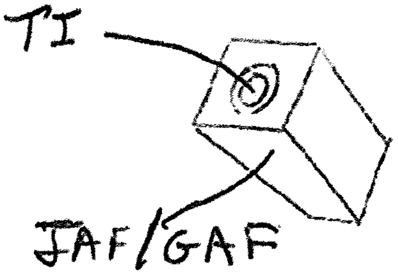
FIG. 38 is an isometric view of a gap adjustment finger or channel adjustment finger JAF that forms part of the frame engaging portion.
Figure 39:
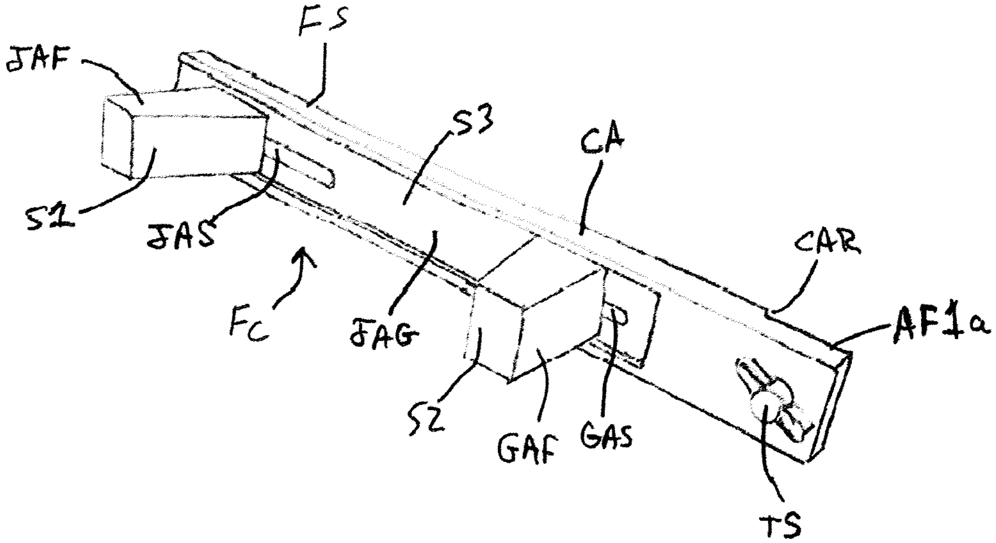
FIGS. 39-42 respectively show additional alternative embodiments of a frame engaging section of a device provided in accordance with the present development.
Figure 40:
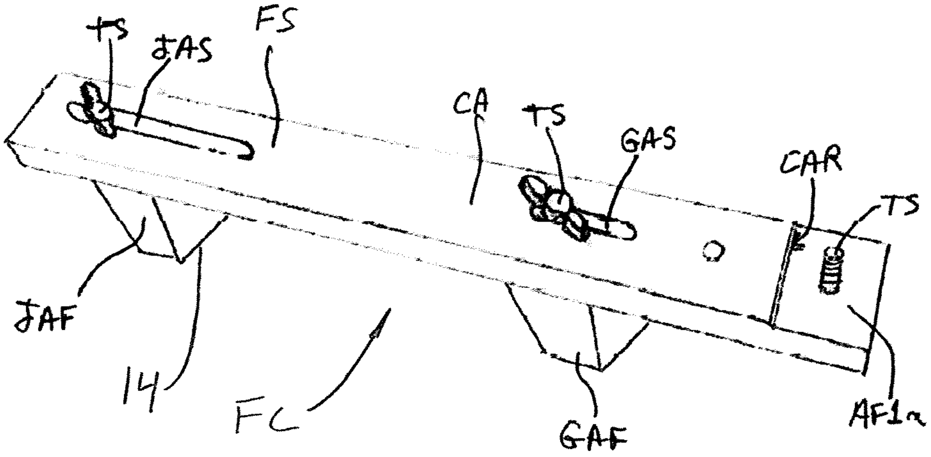
Figure 45:
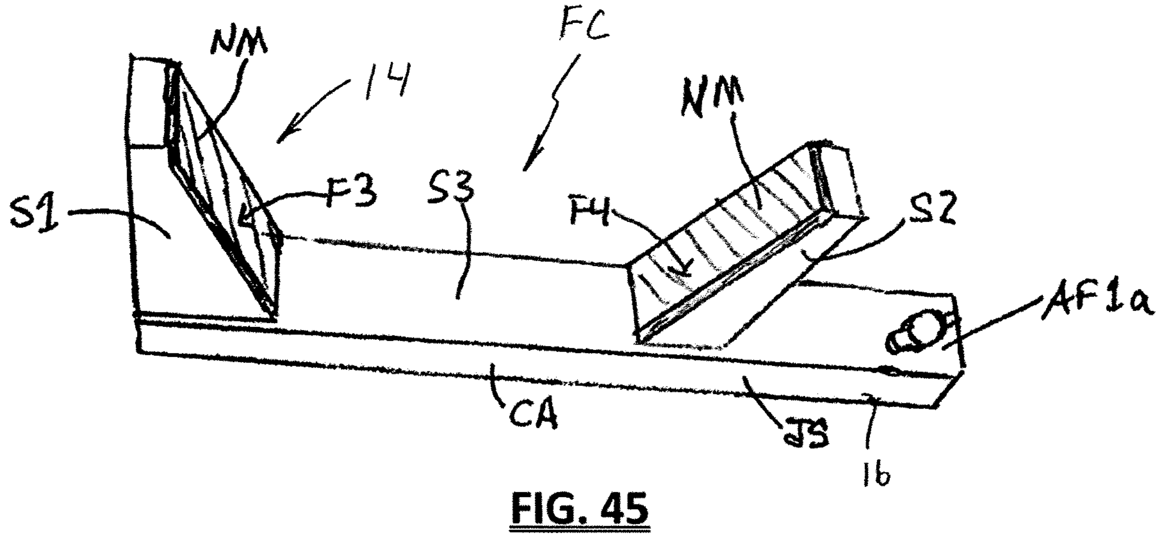
Figure 46:
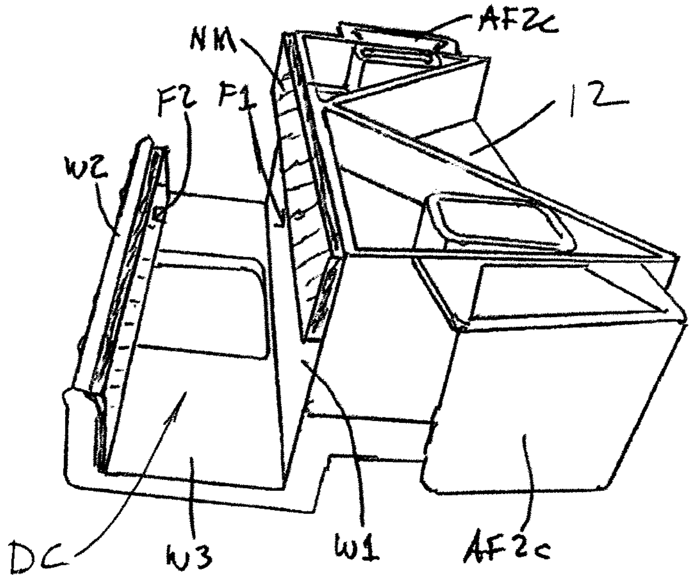

Alternatively, as a first example, the implementation of a frame engaging portion 14 of a door positioning device 10 that allows the adjustment of the door to door-jamb gap G and further accommodates variations in frame widths is represented in FIGS. 37, 39, and 40. A connecting arm CA of a fixed length with attachment features AF1*a* to the door engaging portion 12 utilizes thumbscrews TS to attach the door to door-jamb gap adjustment finger GAF and the jamb channel adjustment finger JAF to the respective elongated slots GAS,JAS with corresponding mating threaded inserts as represented in FIG. 38. When the door to door-jamb gap adjustment finger GAF is secured to the connecting arm CA within the range of the door to door-jamb gap adjustment slot GAS as represented in FIGS. 45 & 46, the jamb channel adjustment finger groove JAG provides rotational stability of the finger. Similarly, when the jamb channel adjustment finger JAF is secured to the connecting arm CA within the range of the jamb channel adjustment slot JAS, the jamb channel adjustment finger groove JAG provides rotational stability of the finger.

Figure 41:
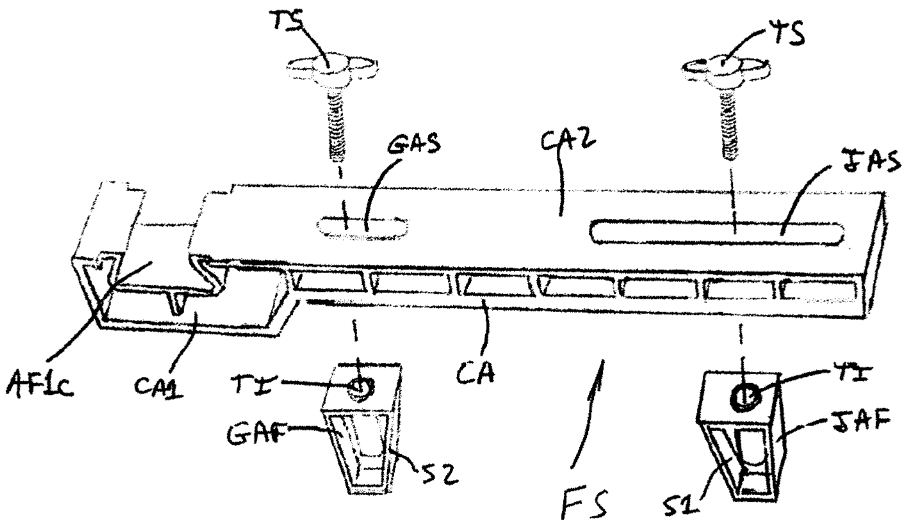
Figure 42:
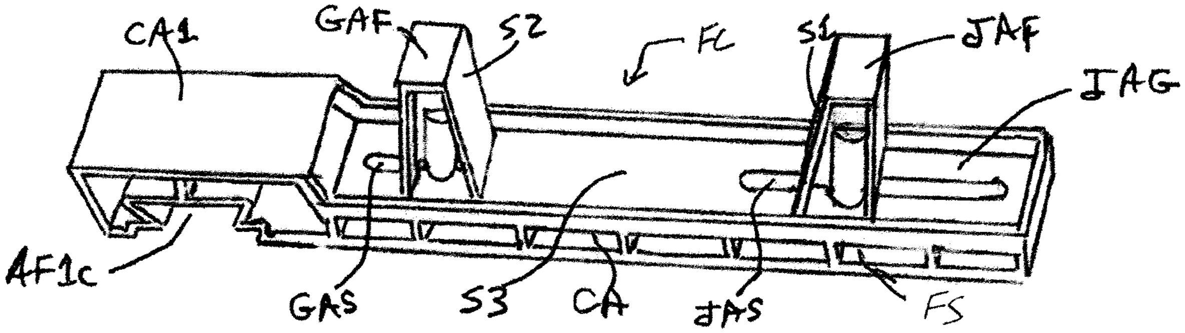

As a second example similarly implemented, a frame engaging portion 14 of a door positioning device 10 that allows the adjustment of the door to door-jamb gap G and further accommodates variations in door jamb plus casing(s) width with a connecting arm CA of a fixed length with attachment features AF1*c* to the door engaging portion 12 formed with the use of but not limited to an injection molding process is represented in FIGS. 41 & 42.

To reduce the possibility of a door positioning device from causing markings during installation and/or operation on the door D or door jamb J and casings C, and to limit incidental movement of the device 10,10',110 and damp vibrations resulting from movement or forces exerted on the door by a person or pet as could cause unintended and undesired movement of the device 10,10',110 from its engaged position to its disengaged position, padding material may be adhered to the door positioning device at the surface contact points to those items. Such non-marking materials or padding NM include but are not limited to felt and foam. Potential application surface faces include but are not limited to faces F1, F2, F3, and/or F4 shown in FIGS. 43-49. In one embodiment, the non-marking material NM comprises a foam such as a closed-cell foam such as VOLARA brand 4EO EVA copolymer foam.

Figure 43:
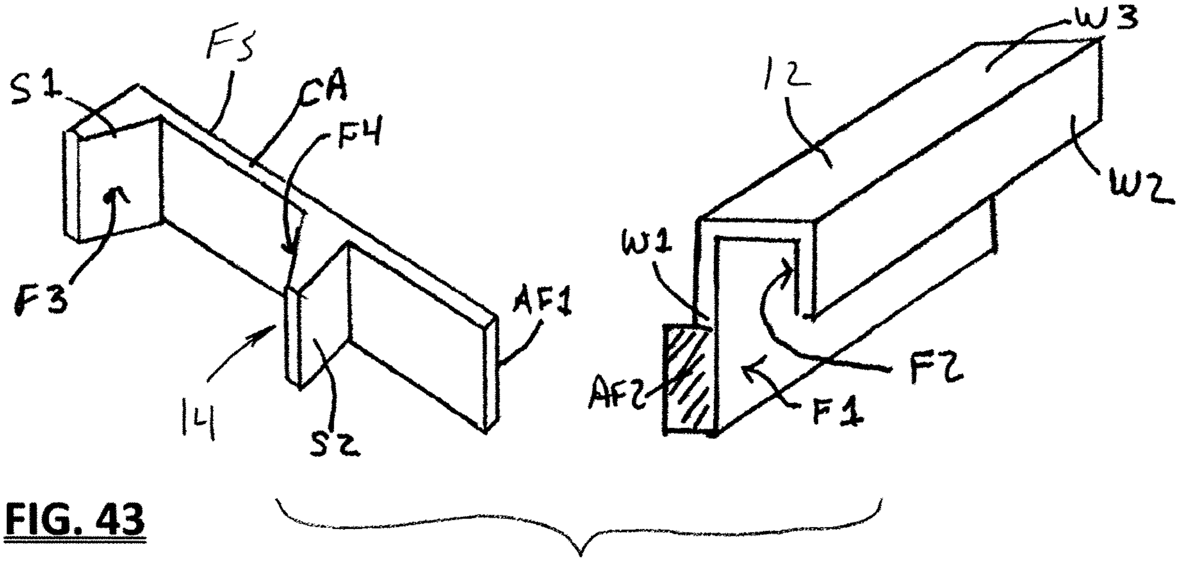
FIGS. 43-49 respectively show additional alternative embodiments of a device provided in accordance with the present development including non-marking padding material applied to different surface to protect the finish of the door and or door frame.
Figure 44:
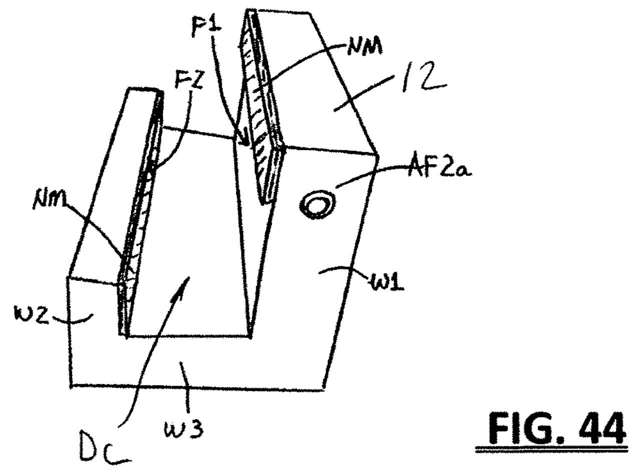
Figure 47:
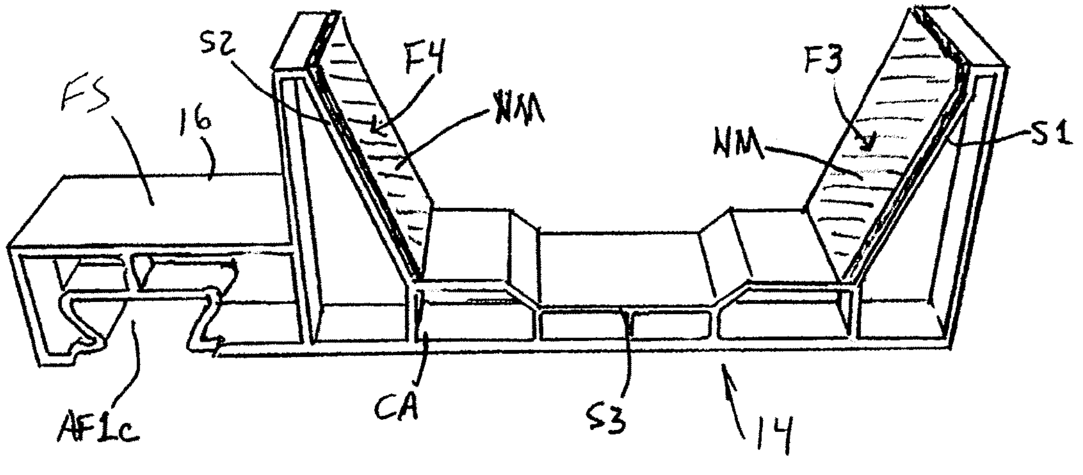
Figure 48:
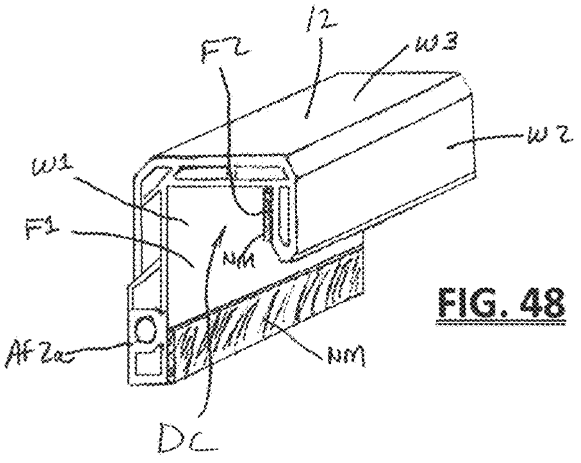
Figure 49:
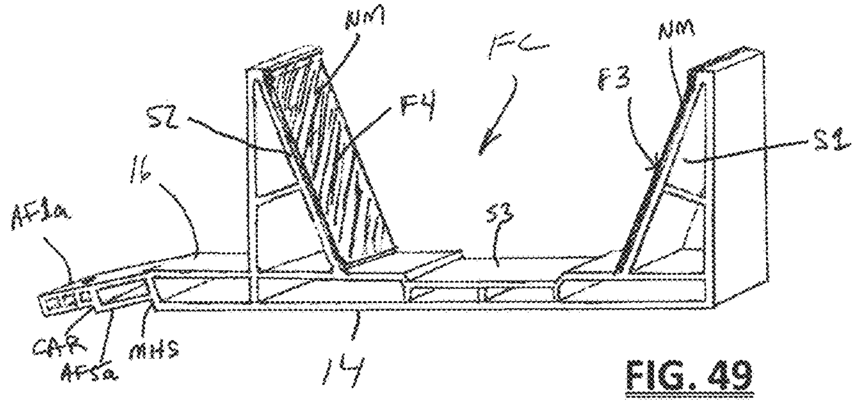

As a first example as shown in FIGS. 43-45, non-marking padding materials NM are applied to a door engaging portion 12 with attachment features AF2*a* to surface face F1 on wall W1 and surface face F2 on wall W2, and for a frame engaging portion 14 with attachment features AF1*a* to surface face F3 on finger S1 and surface face F4 on finger S2. As a second example as shown in FIGS. 46-47, non-marking materials NM are applied to a door engaging portion 12 formed via injection molding or another process with attachment features AF2*c* to the surface face F1 on wall W1 and surface face F2 on wall W2, and to a frame engaging portion 14 formed with the use of but not limited to an injection molding process including attachment features AF1*c* is to surface face F3 on finger S1 and surface face F4 on finger S2. As another example as shown in FIGS. 48-49, non-marking materials NM are applied to door engaging portion 12 formed with the use of but not limited to a plastic extrusion process with attachment features AF2*a* to the surface face F1 on wall W1 and surface face F2 on wall W2, and to a frame engaging portion 14 formed with the use of but not limited to a plastic extrusion process with attachment features AF1*a* to surface face F3 on finger S1 and surface face F4 on finger S2. In one example, the above-noted VOLARA brand 4EO or other foam or other high-friction material is applied to face F1 of wall W1 while felt or other soft low-friction material is to face F2 of wall W2. In this example, the foam or other high-friction non-marking material NM on wall W1 is urged into abutment with the door D when the device 10 is operatively installed and engaged due to the force of gravity acting on the connecting arm CA which pivots the wall W1 into contact with the door D, and this engagement of the foam or other high-friction material NM on face F1 with the door D inhibits any sliding movement of the device 10 toward its disengaged position in response to incidental movement of the door D by a pet or child or the like. When a user desires to move the device 10 from the engaged position toward the disengaged position, the user can lift the connecting arm CA to pivot wall W1 away from the door D to disengage the foam or other high-friction material NM from the door D and to cause the felt or other low-friction material NM on face F2 of wall W2 to engage door for easy sliding movement of the device 10 toward its disengaged position.

Figure 50:
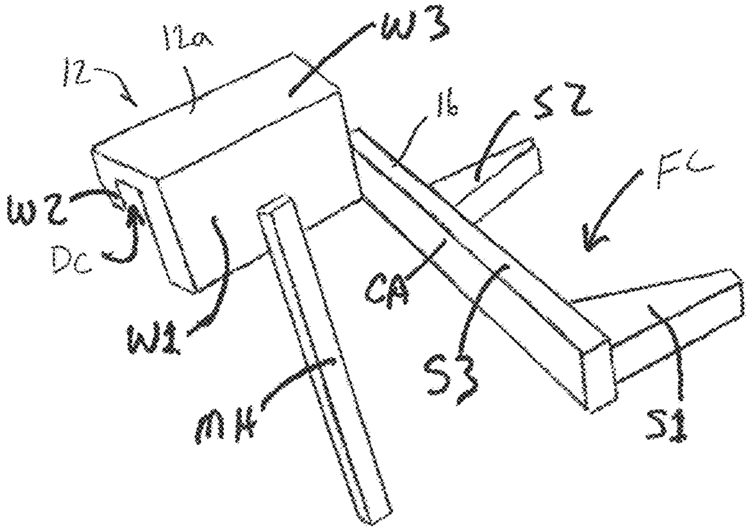
FIGS. 50-53 shows alternative embodiments of the device including an optional maneuvering handle to facilitate user adjustment of the operative position of the device relative to a door on which the device is installed.
Figure 51:
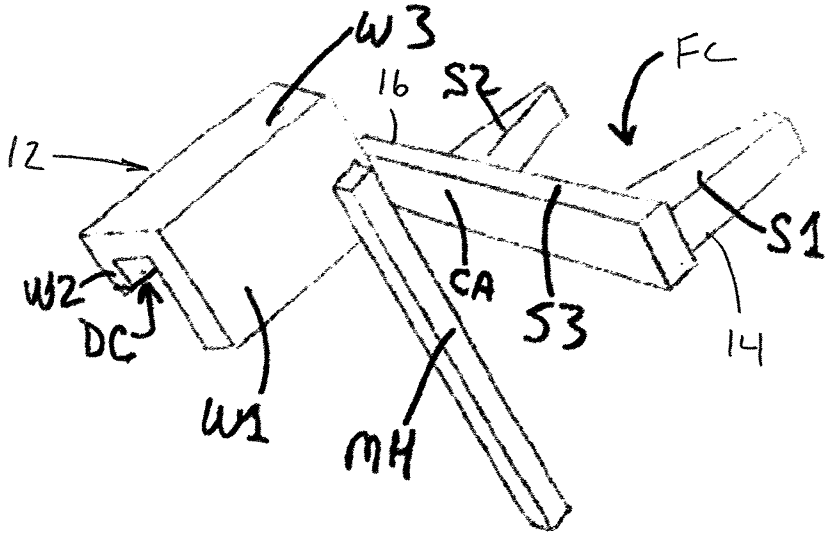
Figure 52:
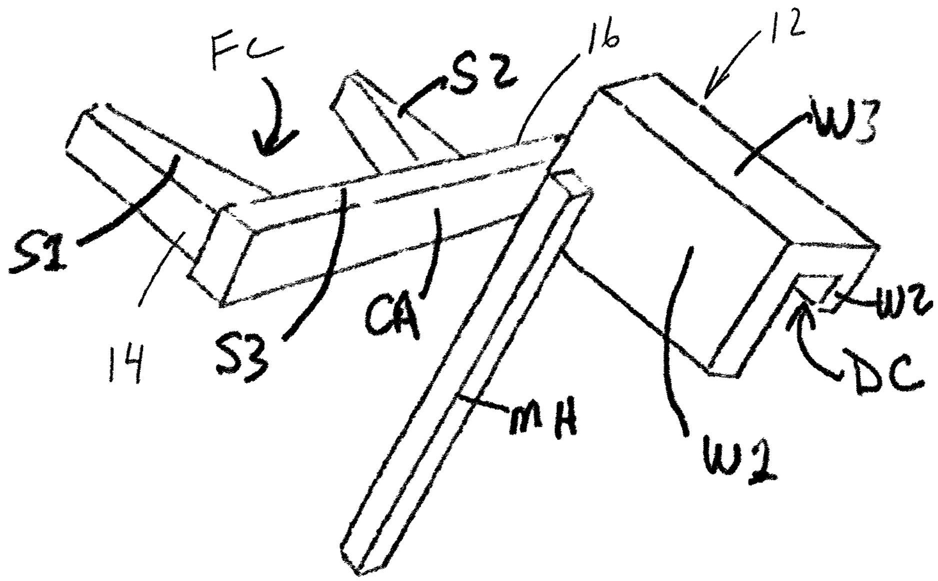
Figure 53:
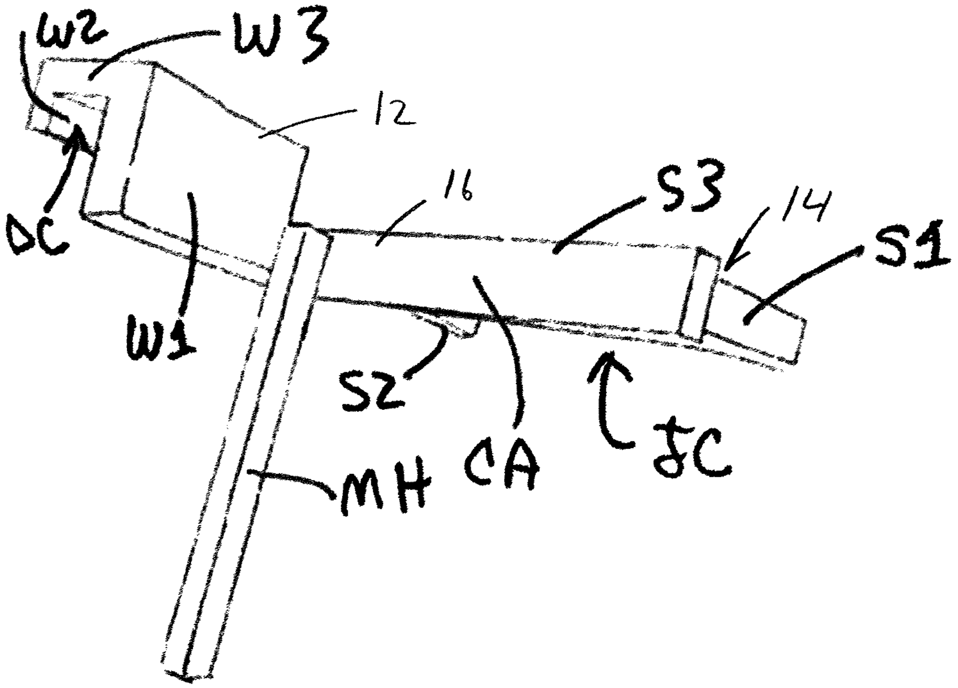

As shown in FIGS. 51-68, depending on the door height, there may be a need for the device 10 (or 10') to include a permanent or optionally attached/detached maneuvering handle MH of any various length for the door positioning device 10 that would be accessible to allow a user when standing on the floor FL (FIG. 3) to grasp the handle MH and slide the door positioning device 10 along the top edge UE of the door D for engaging and disengaging the frame engaging portion 14 with the door frame DF1 should they not be able to do so otherwise. The attachment points of a maneuvering handle MH to the door positioning device 10 include but are not limited to the middle and on the outside of the door engaging portion wall first W1 as represented in FIG. 50, to either end and on the outside of the door channel back wall W1 represented in FIGS. 51 & 52, or to the connecting arm CA near where it meets up with the first wall W1 of the door engaging portion as shown in FIG. 53.

Figure 54:
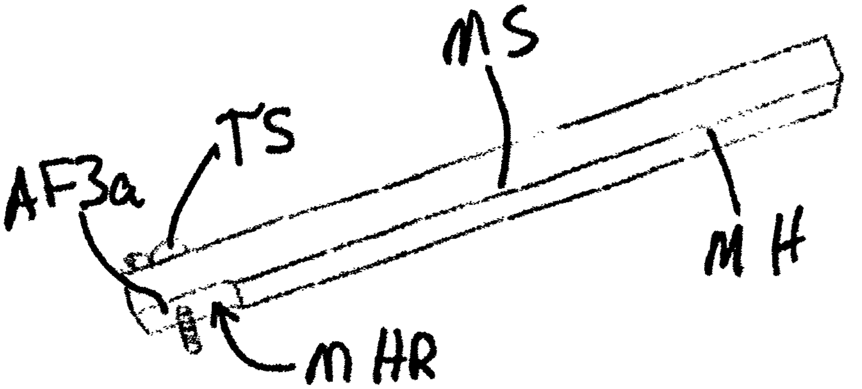
FIG. 54 shows an example of a maneuvering handle.
Figure 55:
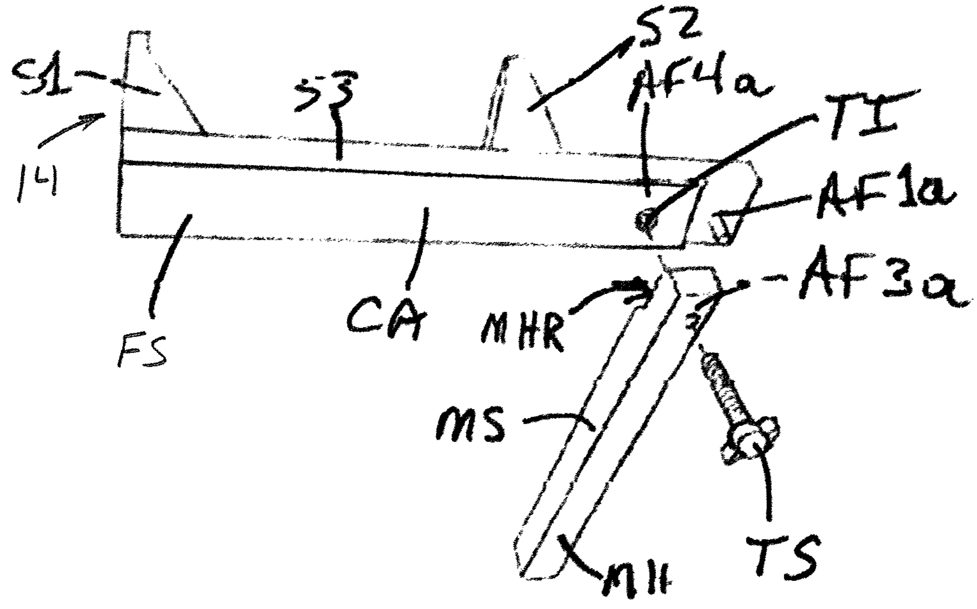
FIGS. 55-58 shows alternative frame sections of the device including an optional maneuvering handle.
Figure 56:
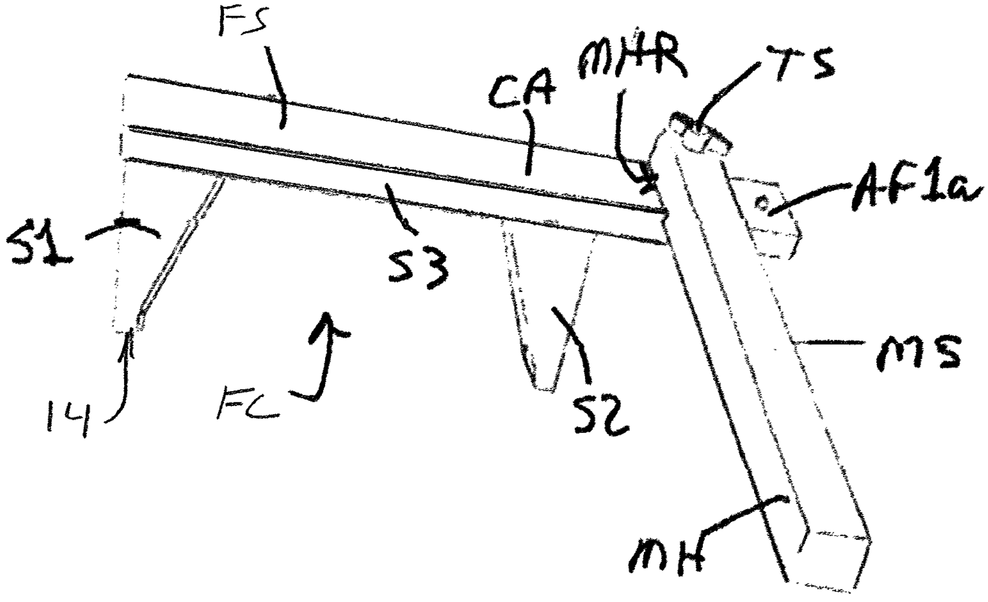
Figure 57:
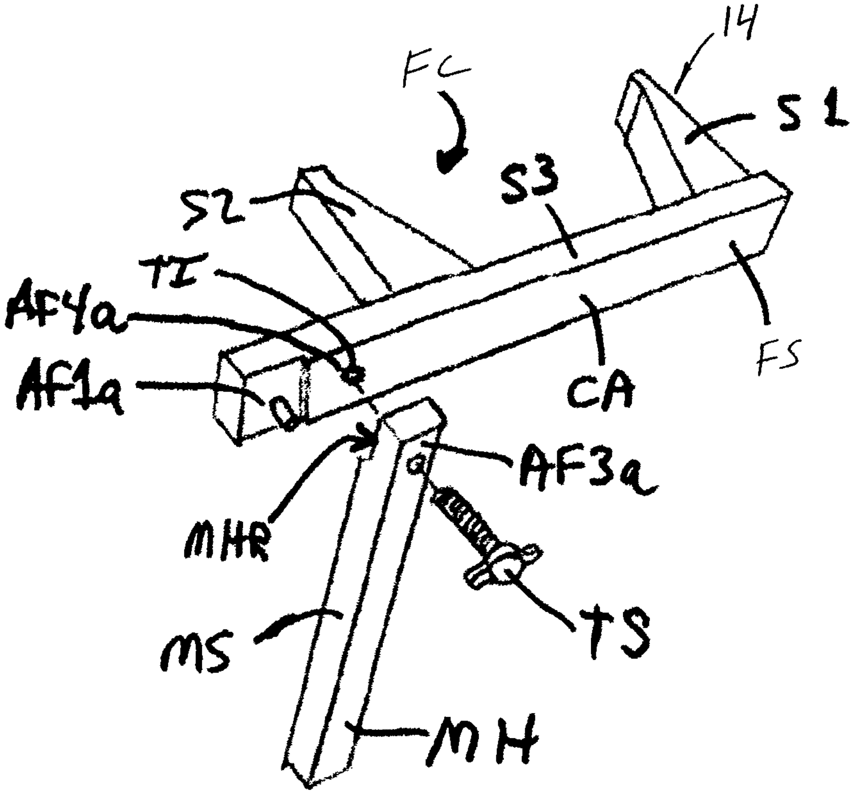
Figure 58:
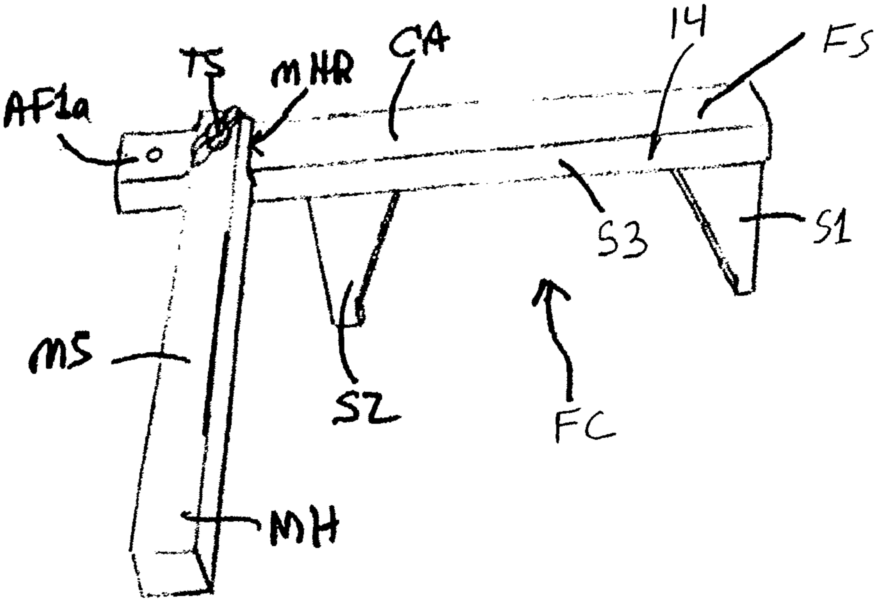
Figure 59:
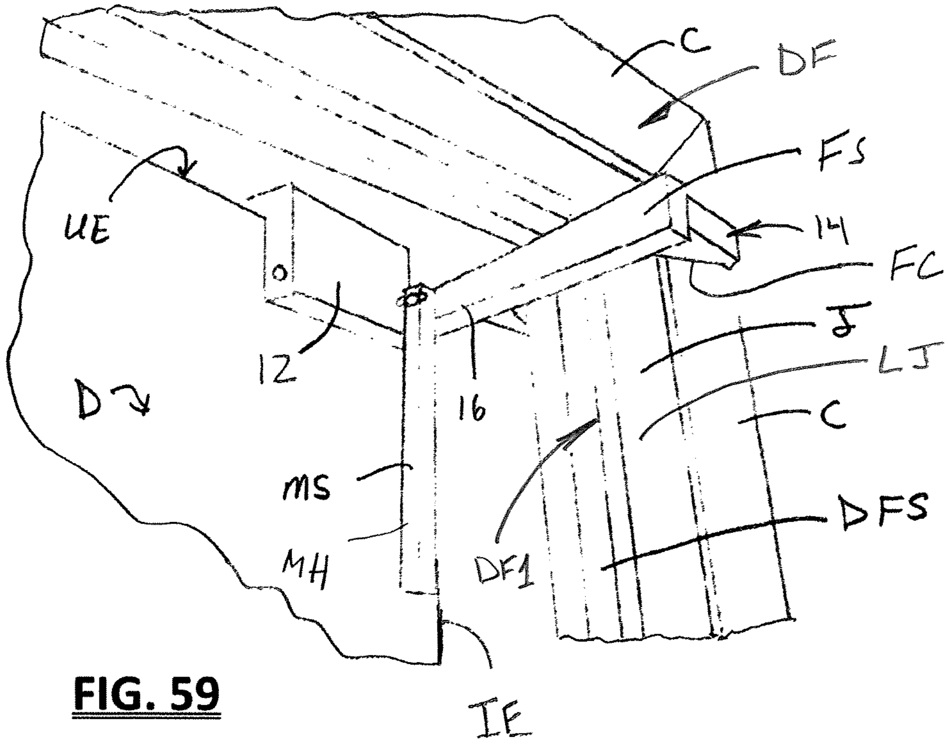
FIG. 59 shows a device provided in accordance with the present development including a maneuvering handle and operatively installed and engaged on a left-hand door unit.
Figure 60:
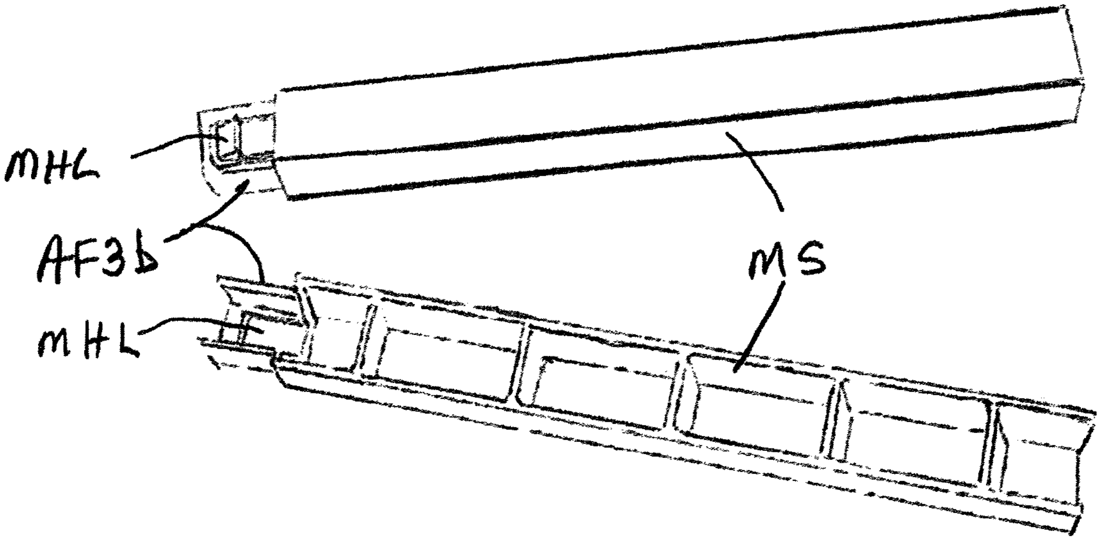
FIG. 60 shows an example of an alternative maneuvering handle.

Alternatively, as a first example, a maneuvering handle MH is provided by a maneuvering handle section MS of any various length is represented in FIG. 54 with attachment features AF3*a* comprising a thumbscrew TS and a maneuvering handle recess feature MHR that attaches to the connecting arm CA of a frame engaging portion 14 that includes attachment features AF4*a* utilizing a mating threaded insert TI as represented in FIGS. 55-56, and that also includes attachment feature AF1*a* for connecting to a mating door engaging portion 12. A maneuvering handle section MS when secured to the connecting arm CA is represented in FIG. 56 that is compatible with a right-hand door unit. Alternatively, the same control arm CA of frame engaging 14 and maneuvering handle section MS when configured as represented in FIG. 57 and secured together as represented in FIG. 58 is compatible with a left-hand door unit as shown in FIG. 59 when attached to a compatible door engaging portion 12 and installed on the upper edge UE of a door D.

Figure 61:
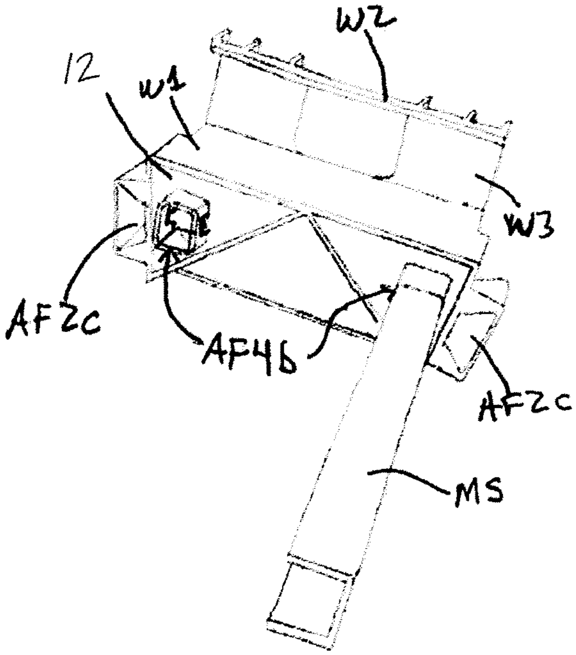
FIGS. 61-63 shows additional alternative embodiments of the device including an optional maneuvering handle to facilitate user adjustment of the operative position of the device relative to a door on which the device is installed.
Figure 62:
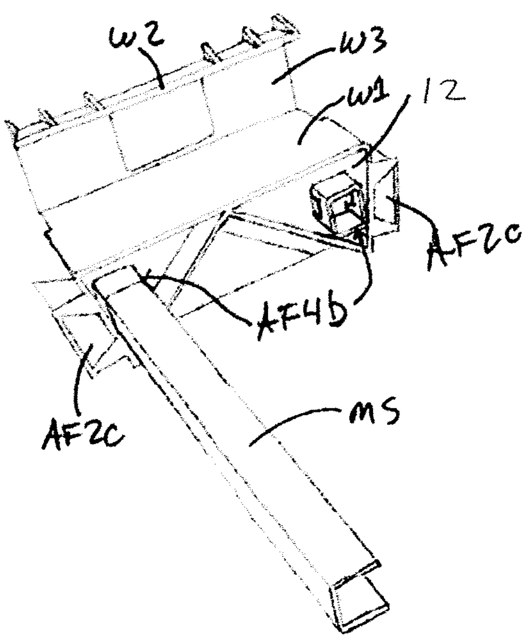
Figure 63:
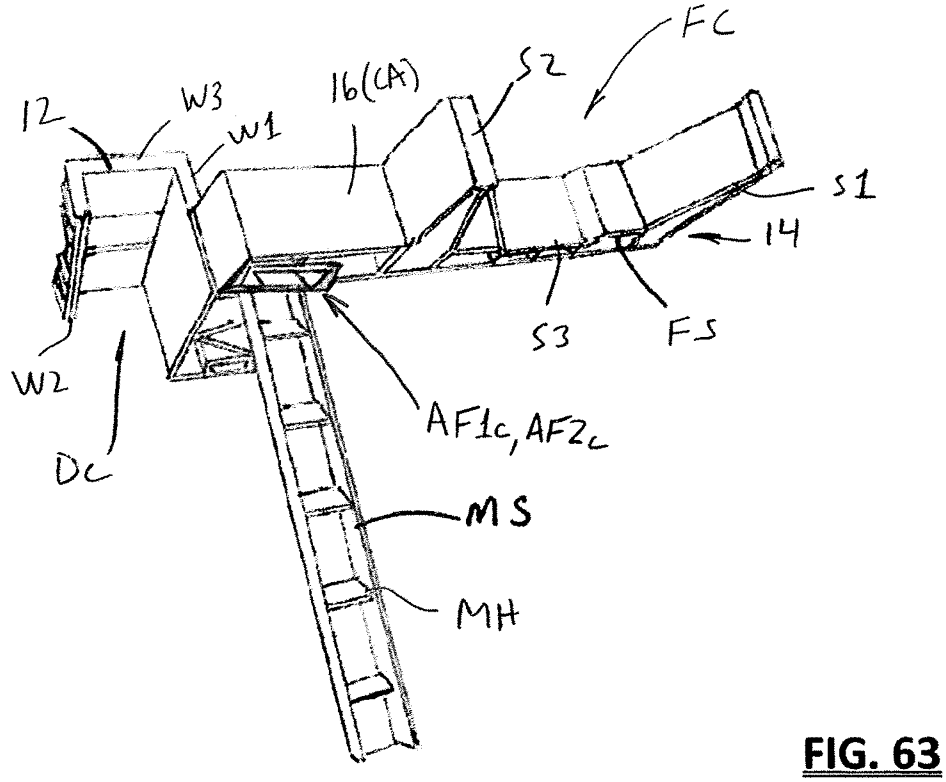

As a second example, the maneuvering handle MH is provided by a maneuvering handle section MS of any various length is formed with the use of but not limited to an injection molding process as shown in FIGS. 60-63 where the maneuvering handle section MS includes attachment features AF3*b* that utilize an integrally molded flexible resilient latching arm MHL within a recessed U-shaped channel. This maneuvering handle section MS mates with socket attachment features AF4*b* of a corresponding injection molded door engaging portion 12 that includes mating attachment features AF2*c* and is securely installed as represented in FIG. 61 to be compatible with a right-hand door unit. Alternatively, the same maneuvering handle section MS when securely installed within the attachment features AF4*b* at the opposite end of the door engaging portion 12 as represented in FIG. 62 is compatible with a left-hand door unit. A fully assembled door positioning unit 10 with a door engaging portion 12, frame engaging portion 14, connecting portion 16, and maneuvering handle section MS as shown in FIG. 63 is compatible with a right-hand door unit.

Figure 64:
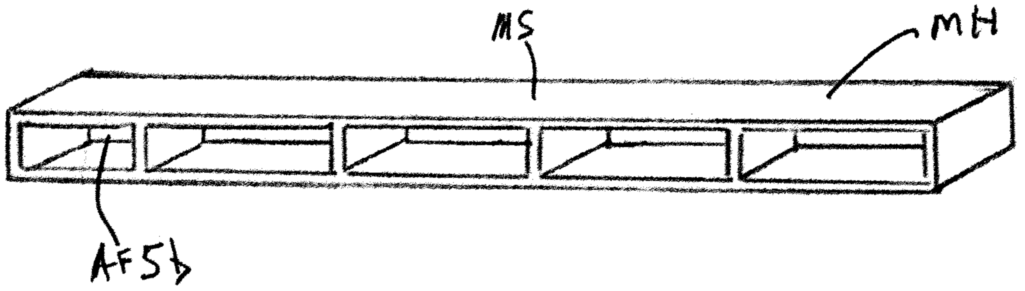
FIG. 64 shows another example of an alternative maneuvering handle.
Figure 65:
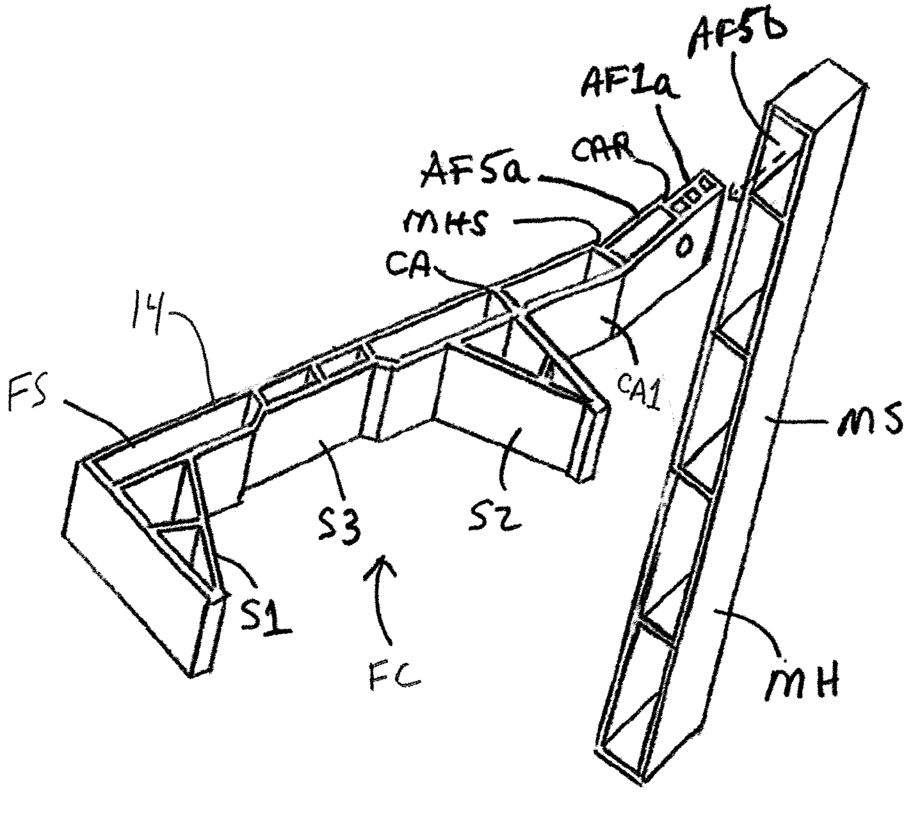
FIGS. 65-67 shows alternative frame sections of the device including an optional maneuvering handle.
Figure 66:
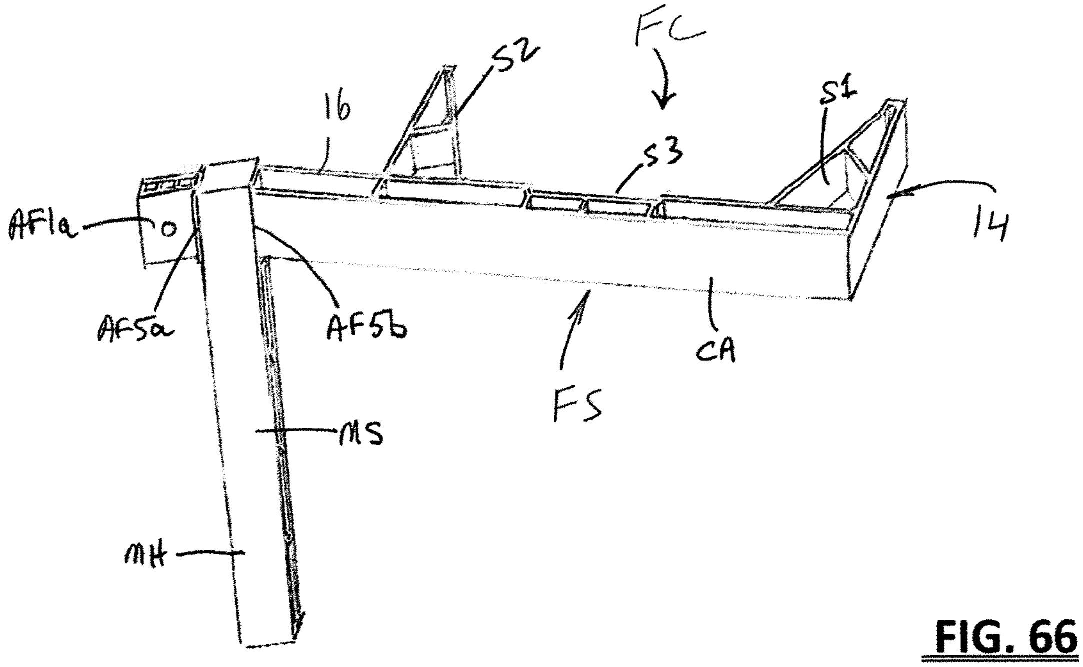
Figure 67:
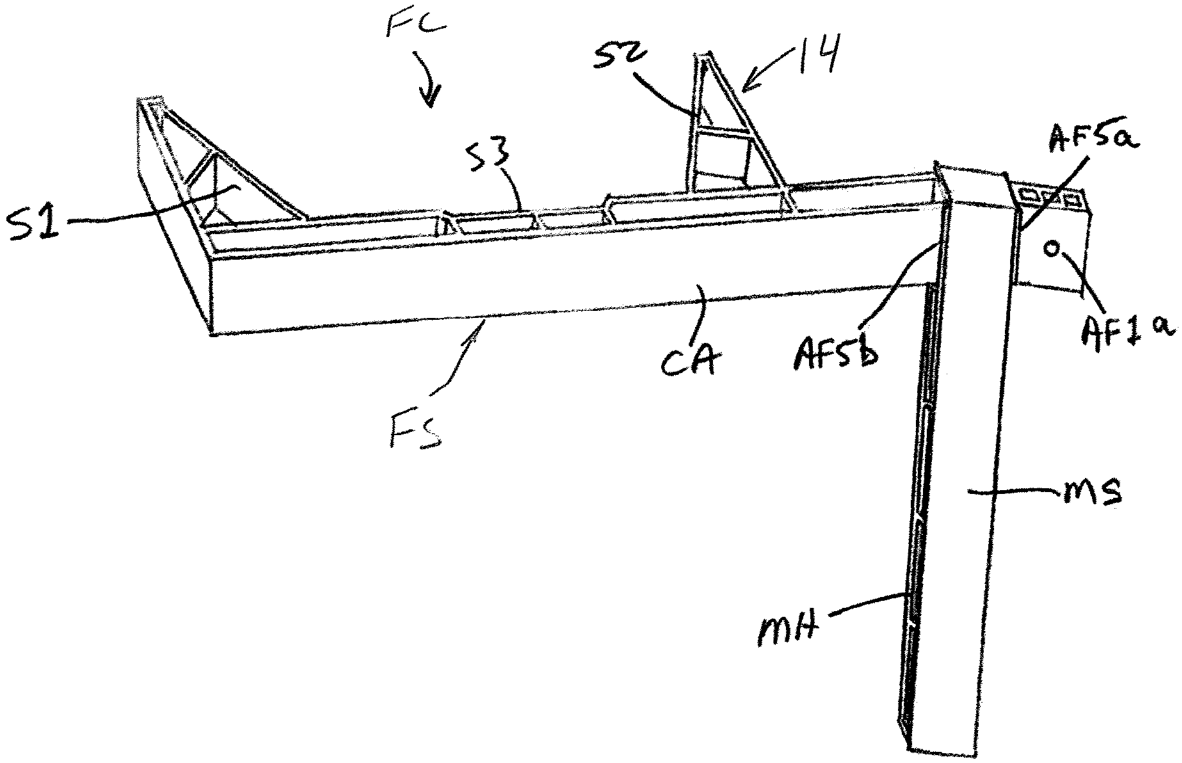
Figure 68:
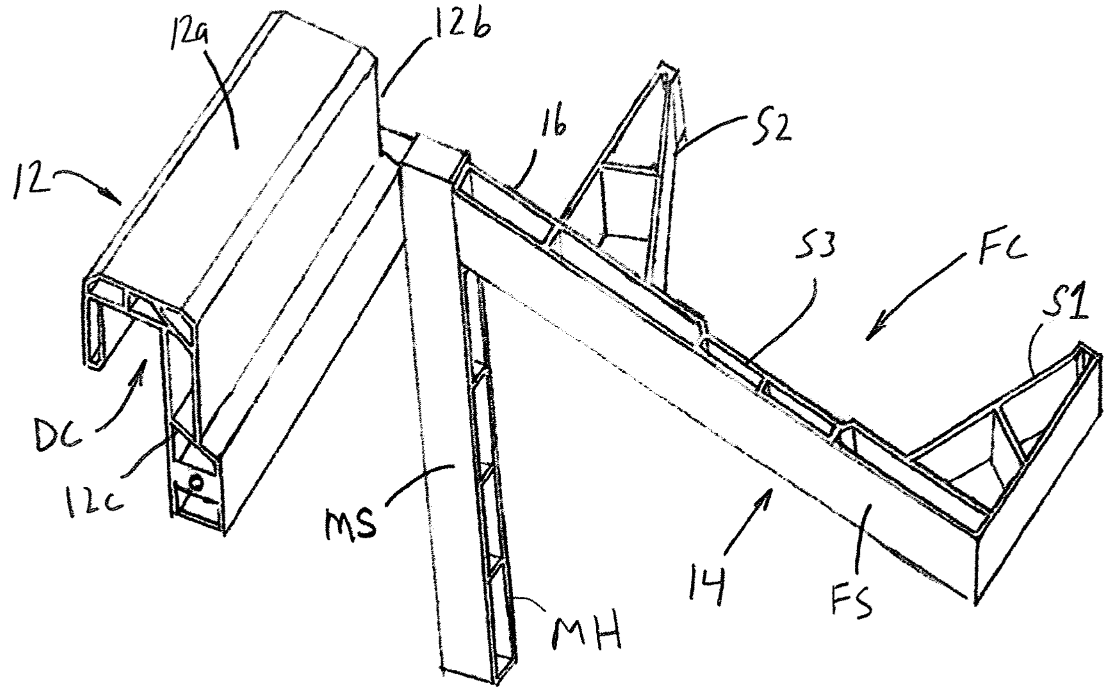
FIG. 68 shows a device including an optional maneuvering handle in accordance with an embodiment of the present development.

As another example, a maneuvering handle section MS of any various length can be formed by a plastic extrusion process as represented in FIG. 64 and include an attachment feature AF5*b* comprising an open cavity that receives fits snuggly with a friction fit around a mating attachment feature AF5*a* implemented toward the first end CA1 of the connecting arm CA and slides up past the connecting arm attachment feature AF1*a* to a shoulder that provides maneuvering handle stop MHS as represented in FIGS. 65 & 66. A securely installed maneuvering handle section MS that is compatible with a left-hand door unit is shown in FIG. 66 and a securely installed maneuvering handle section MS that is compatible with a right-hand door unit is shown in FIG. 67. A fully assembled door positioning unit 10 with a door engaging portion 12, frame engaging portion 14, connecting arm 16 that connects the frame engaging portion 14 to the door engaging portion 12, and including an optional maneuvering handle section MS is shown in FIG. 68 and is compatible with a left-hand door installation (but can be converted to a device 10 that is compatible with a right-hand door installation by alternatively connecting the inner end CA1 of the connecting arm to the end 12*c* of the door engaging portion 12.

Figure 69:
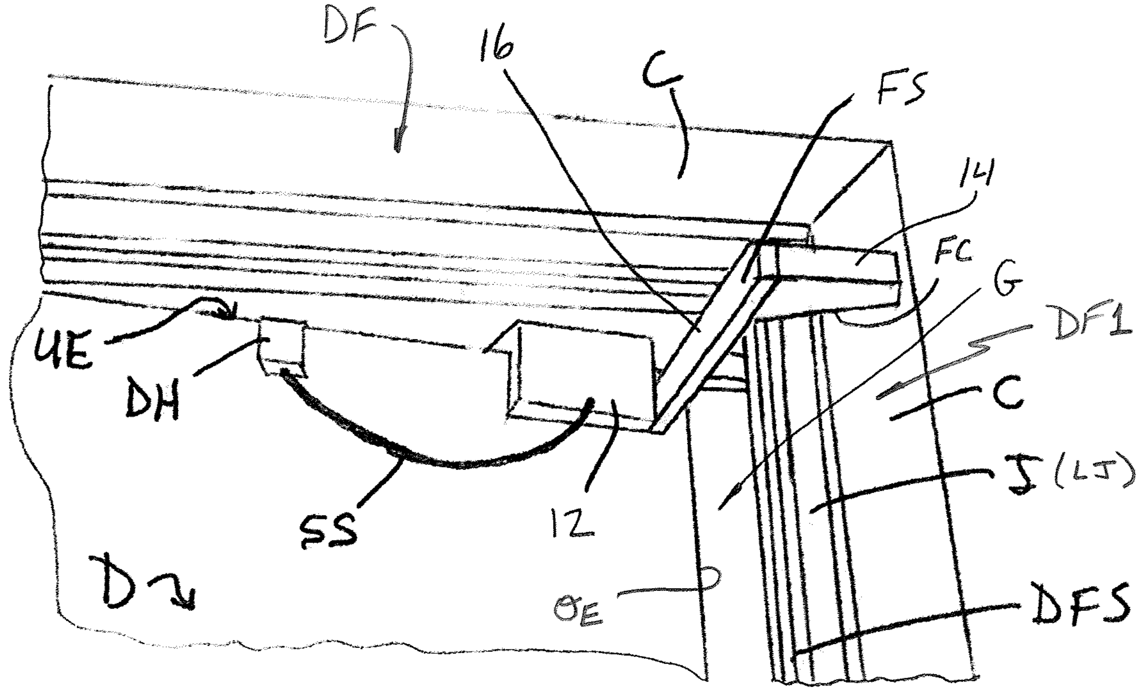
FIG. 69 shows a device including an optional storage strap system in accordance with an embodiment of the present development, with the device in its operatively installed and engaged condition.
Figure 70:
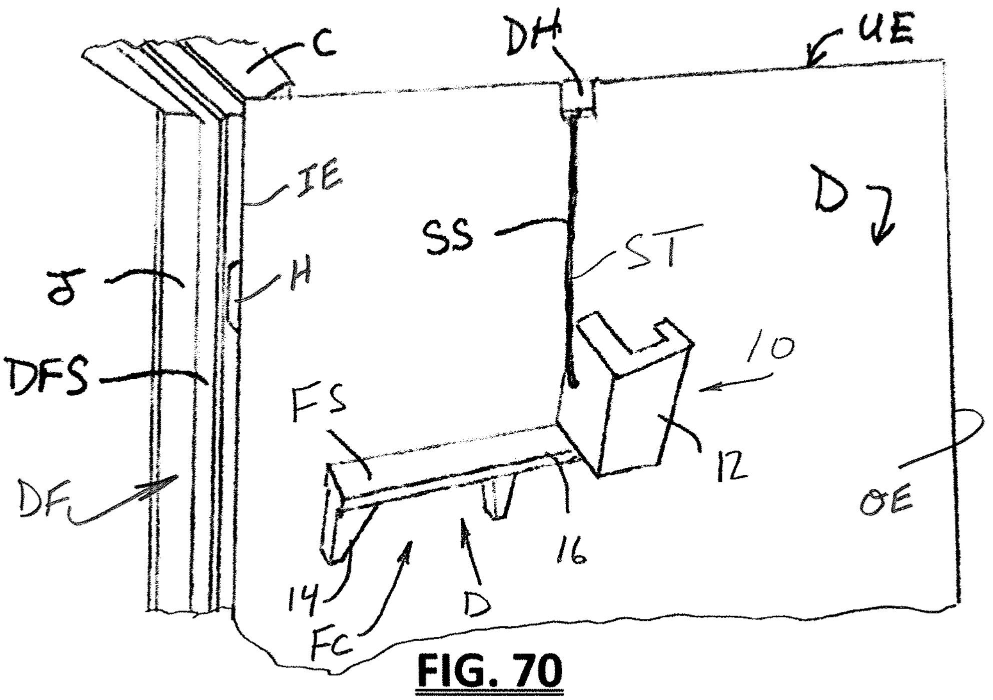
FIG. 70 shows the device of FIG. 69 in an uninstalled storage position on the door.
Figure 71:
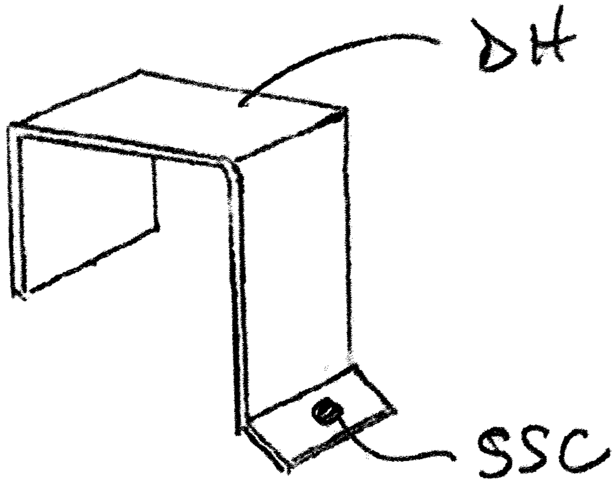
FIG. 71 shows a door hook portion of the storage strap system.

As a convenience for the user of a door position device 10, an optional storage strap system SS can be provided to connect to the door engaging portion 12 or other part of the device 10 to a door hook DH of any various type that is also engaged with the door upper edge UE as shown in FIG. 69. The storage strap system SS includes the door hook DH and a flexible strap ST that extends between and is connected to the door hook DH and the door engaging portion 12 or other part of the device to provide a means to attach the door positioning device 10 to the door D as represented in FIG. 70 when the device 10 it is not operatively installed on the door upper edge UE or when the device 10 inadvertently releases from the top edge UE of the door. An example of a door hook device DH with a storage strap connection point SSC for connection of the strap ST to the door hook DH is represented in FIG. 71. Those of ordinary skill in the art will recognize that the use of the storage strap system SS when the door positioning device in located in an inoperative position as shown in FIG. 70 allows the door D to be completely closed and when the door positioning device 10 is not in use.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A door positioning device comprising:

a door engaging portion including a door channel adapted to receive an associated door upper edge;

a frame engaging portion including a frame channel adapted to receive an associated door frame;

a connecting portion that extends between and interconnects the door engaging portion and the frame engaging portion;

wherein the connecting portion maintains a fixed distance between the door engaging portion and the frame engaging portion;

wherein the frame engaging portion and connecting portion are provided as a frame section and wherein the frame section is selectively connected to the door engaging portion in one of: (i) a first orientation in which the door engaging portion and the frame engaging portion are arranged relative to each other for positioning an associated left-hand door unit; (ii) a second orientation in which the door engaging portion and frame engaging portion are arranged relative to each other for positioning an associated right-hand door unit;

wherein the connecting portion includes a primary attachment feature and the door engaging portion includes at least one secondary attachment feature that selectively mates with the primary attachment feature on the connecting portion to secure the connecting portion and the frame engaging portion to the door engaging portion;

and wherein the at least one secondary attachment feature of the door engaging portion comprises first and second secondary attachment features located respectively at first and second opposite axial ends of the door engaging portion, and wherein said primary attachment feature of said connecting portion is selectively attached to:

(i) the first secondary attachment feature in a first configuration where the door engaging portion and the frame engaging portion are arranged relative to each other in said first orientation for positioning an associated left hand door unit;

(ii) the second secondary attachment feature in a second configuration where the door engaging portion and the frame engaging portion are arranged relative to each other in said second orientation for positioning an associated right hand door unit.

2. The door positioning device as set forth in claim 1, wherein the fixed distance is adjustable.

3. The door positioning device as set forth in claim 1, wherein said door engaging portion comprises a U-shaped body including first and second spaced-apart side walls and a transverse connecting wall that extends between and connects the first and second side walls such that the door channel is defined by the first and second side walls and the connecting wall.

4. The door positioning device as set forth in claim 3, wherein a distance between the first and second side walls is one of: (i) fixed; (ii) adjustable.

5. The door positioning device as set forth in claim 3, wherein at least one of the first and second side walls is selectively movable toward and away from the other of the first and second side walls and can be selectively fixed in position relative to the other of the first and second side walls.

6. The door positioning device as set forth in claim 1, wherein said frame channel is defined between first and second spaced-apart fingers and by a connecting region that extends between the first and second spaced-apart fingers.

7. The door positioning device as set forth in claim 6, wherein a distance between the first and second spaced-apart fingers is one of: (i) fixed; (ii) adjustable.

8. The door positioning device as set forth in claim 6, wherein at least one of the first and second spaced-apart fingers is selectively movable toward and away from the other of the first and second spaced-apart fingers and can be selectively fixed in position relative to the other of the first and second spaced-apart fingers to define a frame channel width of the frame channel.

9. The door positioning device as set forth in claim 6, wherein said first and second spaced-apart fingers and said connecting region of said frame channel are part of a C-shaped section connected to said connecting portion, and wherein a position of said C-shaped section on said connecting portion can be selectively adjusted.

10. The door positioning device as set forth in claim 1, further comprising a maneuvering handle for user grasping and sliding said door engaging portion on the associated door upper edge between an engaged operative position in which the frame channel is engaged with the associated door frame and a disengaged operative position in which the frame channel is disengaged from the associated door frame.

11. The door positioning device as set forth in claim 1, further comprising a storage strap system including a door hook adapted to be connected to the associated door upper edge and a strap that is connected to the door hook and the door positioning device to connect the door positioning device to the associated door when the door positioning device is in an inoperative position in which the door channel is disengaged from the associated door upper edge.

12. The door positioning device as set forth claim 1, further comprising non-marking material connected to at least one of the door engaging portion and the frame engaging portion.

* * * * *